US010730000B2

(12) United States Patent
Johnson et al.

(10) Patent No.: US 10,730,000 B2
(45) Date of Patent: Aug. 4, 2020

(54) FILTER ASSEMBLY AND METHODS

(71) Applicant: Donaldson Company, Inc., Minneapolis, MN (US)

(72) Inventors: Philip E. Johnson, Apple Valley, MN (US); Jonathan G. Parsons, Lino Lakes, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 324 days.

(21) Appl. No.: 15/567,948

(22) PCT Filed: Apr. 19, 2016

(86) PCT No.: PCT/US2016/028278
§ 371 (c)(1),
(2) Date: Oct. 19, 2017

(87) PCT Pub. No.: WO2016/172101
PCT Pub. Date: Oct. 27, 2016

(65) Prior Publication Data
US 2018/0117518 A1    May 3, 2018

Related U.S. Application Data

(60) Provisional application No. 62/150,619, filed on Apr. 21, 2015, provisional application No. 62/205,792, filed on Aug. 17, 2015.

(51) Int. Cl.
*B01D 29/21* (2006.01)
*B01D 29/54* (2006.01)
(Continued)

(52) U.S. Cl.
CPC .......... *B01D 46/522* (2013.01); *B01D 29/21* (2013.01); *B01D 29/54* (2013.01); *B01D 35/005* (2013.01);
(Continued)

(58) Field of Classification Search
CPC .............. B01D 46/522; B01D 46/2411; B01D 46/2414; B01D 46/125; B01D 29/21;
(Continued)

(56) References Cited

U.S. PATENT DOCUMENTS 2,587,683 A * 3/1952 Barry ................ B05C 17/00586
222/89
2,587,693 A    3/1952 Burks et al.
(Continued)

FOREIGN PATENT DOCUMENTS

DE    2625416 A1    12/1977
EP    0352188 A1    1/1990

OTHER PUBLICATIONS

Office Action for U.S. Appl. No. 14/521,811, dated Jan. 23, 2019.
(Continued)

*Primary Examiner* — Minh Chau T Pham
(74) *Attorney, Agent, or Firm* — Merchant & Gould P.C.

(57) ABSTRACT

A filter element includes at least first and second opposing pleated media sections and at least first and second support structures supporting, absent an inner liner, the at least first and second media sections and being layered between the at least first and second media sections. In another embodiment, the filter element includes a continuous construction of pleated media forming the first and second opposing pleated media sections, in which the pleats have portions of differing lengths, and a support structure within the interior volume supporting the first and second media sections. The filter element can be in the form of two racetracks, a V-pack, or two V-packs. The racetracks can be polygon shaped.

19 Claims, 26 Drawing Sheets

(51) Int. Cl.
*B01D 46/52* (2006.01)
*B01D 46/12* (2006.01)
*B01D 46/24* (2006.01)
*B01D 35/00* (2006.01)

(52) U.S. Cl.
CPC ........ *B01D 46/125* (2013.01); *B01D 46/2411* (2013.01); *B01D 46/2414* (2013.01); *B01D 2201/0415* (2013.01); *B01D 2201/122* (2013.01); *B01D 2201/298* (2013.01); *B01D 2201/60* (2013.01); *B01D 2201/602* (2013.01); *B01D 2265/04* (2013.01); *B01D 2265/06* (2013.01)

(58) Field of Classification Search
CPC .. B01D 29/54; B01D 35/005; B01D 2201/60; B01D 2201/602; B01D 2201/298; B01D 2201/122; B01D 2201/0415; B01D 2265/04; B01D 2265/06
USPC ....... 55/497, 498, 479, 521, 529; 210/493.1, 210/493.2, 493.4, 493.5
See application file for complete search history.

(56) References Cited

U.S. PATENT DOCUMENTS

| | | |
|---|---|---|
| 3,246,766 A | 4/1966 | Pall |
| 3,252,270 A | 5/1966 | Pall et al. |
| 3,420,377 A * | 1/1969 | Vandersip ............ B01D 27/108 210/315 |
| 3,941,571 A | 3/1976 | Getzin |
| 4,141,128 A | 2/1979 | Wonderling |
| 4,231,770 A | 11/1980 | Johnson, Jr. |
| 4,259,095 A | 3/1981 | Johnson, Jr. |
| 4,673,503 A | 6/1987 | Fujimoto |
| 5,230,455 A | 7/1993 | Price |
| 5,800,580 A | 9/1998 | Feldt |
| 6,099,729 A | 8/2000 | Cella et al. |
| 6,482,247 B2 | 11/2002 | Jaroszczyk et al. |
| 6,511,599 B2 | 1/2003 | Jaroszczyk et al. |
| 6,569,330 B1 | 5/2003 | Sprenger et al. |
| 6,875,342 B2 | 4/2005 | Shane |
| 7,311,747 B2 * | 12/2007 | Adamek ................ B01D 29/21 55/498 |
| 7,597,734 B2 | 10/2009 | Johnson et al. |
| 7,648,546 B2 * | 1/2010 | Haberkamp ......... B01D 46/522 210/493.1 |
| 7,883,291 B2 | 2/2011 | Theisen et al. |
| 8,282,713 B2 | 10/2012 | Smithies et al. |
| 8,449,638 B2 | 5/2013 | Gieseke et al. |
| 8,496,120 B2 | 7/2013 | Willuweit |
| 10,391,437 B2 * | 8/2019 | Payyappilly ......... B01D 46/528 |
| 2005/0072129 A1 | 4/2005 | Daleiden |
| 2005/0082217 A1 | 4/2005 | Hagg et al. |
| 2006/0174768 A1 | 8/2006 | Taylor et al. |
| 2007/0045167 A1 * | 3/2007 | Jaroszczyk ......... B01D 46/0067 210/337 |
| 2008/0092501 A1 | 4/2008 | Sporre et al. |
| 2014/0144111 A1 | 5/2014 | Campbell et al. |
| 2015/0151233 A1 | 6/2015 | Johnson et al. |

OTHER PUBLICATIONS

International Search Report and Written Opinion for PCT/US2016/028278, dated Jul. 18, 2016.
International Search Report and Written Opinion for PCT/US2014/062019, dated Feb. 12, 2015.

* cited by examiner

FILTER ASSEMBLY AND METHODS

This application is a National Stage application of PCT International Patent application No. PCT/US2016/028278, filed Apr. 19, 2016, which claims priority to U.S. Provisional patent application Ser. No. 62/150,619, filed Apr. 21, 2015, and U.S. Provisional patent application Ser. No. 62/205,792, filed Aug. 17, 2015, which applications are incorporated herein by reference. To the extent appropriate, a claim of priority is made to each of the above disclosed applications.

TECHNICAL FIELD

The present disclosure relates to filter assemblies. The filter assemblies can be used for liquid filtration, such as oil or fuel; or, it can be used for air filtration.

BACKGROUND

Filters have been employed in a variety of applications including hydraulic systems, engine systems, and fuel systems. Engine systems can include lubrication systems or air systems. In these types of systems, a filter cartridge is periodically replaced. The periodic replacement of the filter cartridge is important to protect the systems and equipment from contaminant.

Typical filter cartridges will use some type of filtration media as a way of removing contaminant from the fluids to be filtered. The amount of filter media used depends upon factors such as the amount of restriction that can be tolerated within the system and the desired service life. With little filter media, the service life is very short, and it would require very frequent servicing, which is inconvenient to the user. The amount of filter media usable, however, is often limited by the geometry of the housing for the filter cartridge. Improvements are desirable.

SUMMARY

In accordance with principles of this disclosure and to improve the problems of the prior art, a filter element is provided including at least first and second opposing pleated media sections; and at least first and second support structures supporting, absent an inner liner, the at least first and second media sections and being layered between the at least first and second media sections.

The filter element can include first and second opposite end caps secured to opposite ends of the media sections.

The pleats of the first and second media sections can have pleats of substantially a same length. The pleats can also be of different lengths. The pleat lengths are measured as the distance between inner pleat tips or folds and outer pleat tips or folds.

The first and second media sections may also include third and fourth opposing media sections.

The at least first and second support structures may include first, second, and third support structures supporting, absent an inner liner, the first, second, third, and fourth media sections and are layered therebetween.

In embodiments having first, second, third, and fourth media sections, the pleats can be of substantially a same length, or there can be portions of different pleat lengths.

The first, second, third, and fourth media sections and first, second, and third support structures can be configured such that an outer perimeter defined by the outward facing portions of the first, second, third, and fourth media sections and first, second, and third support structures is polygonal. The polygonal shape may include at least one of hexagon, octagon, and decagon, or any multi-sided shape.

The first, second, third, and fourth media sections and the first, second, and third support structures may be configured such that an outer perimeter defined by the outward facing portions of the first, second, third, and fourth media sections and first, second, and third support structures has two opposite domes joined by opposite flat sides.

In some embodiments, the first and second media sections are a continuous pleated media section forming a first media racetrack within a first interior volume. The first support structure is operably oriented in the first interior volume. The third and fourth media sections may be a continuous pleated media section forming a second media racetrack within a second interior volume. The second support structure is operably oriented in the second interior volume. The first media racetrack is spaced from the second media racetrack with a third interior volume there between. The third support structure is operably oriented in the third interior volume.

In some embodiments, the first and second media sections form a first media V-pack with a first interior volume. The first support structure is operably oriented in the first interior volume. The third and fourth media sections form a second media V-pack with a second interior volume. The second support structure is operably oriented in the second interior volume.

The support structures may each comprise a pleated construction having pleats extending in a direction non-parallel and angled relative to a direction of pleats of the pleated media sections.

The pleats of each of the pleated constructions may extend at an angle 80-100 degrees relative to the direction of pleats of the pleated media sections.

In some embodiments, each of the pleated constructions may include a semi-rigid pleated screen.

In some embodiments, each of the support structures includes at least a first wall of porous material oriented against the filter media in the interior volume; at least a second wall of porous material spaced from and opposing the first wall and oriented against the filter media in the interior volume; and the first wall and second wall being secured together in opposing relation.

In some embodiments, each of the support structures comprises a plurality of molded spacers. The molded spacers can be spaced from each other and be angled at a non-zero and non-perpendicular angle relative to the direction of pleats of the pleated media sections.

Each of the support structures can be non-metal. Alternatively, the support structures can include at least a portion that is metal-conductive.

In some embodiments, each of the support structures extends a complete length between the first and second end caps. Alternatively, each of the support structures can extend less than a complete length between the first and second end caps.

The first end cap can be an open end cap. The second end cap can be a closed end cap.

In many embodiments, the filter element is free of an inner liner.

The pleated media sections have inner pleat tips, and the inner pleat tips can be bonded to the support structures.

The pleated media sections may include bi-component filter media thermally bonded to the support structures.

The pleated media sections may include media pre-impregnated with epoxy thermally bonded to the support structures.

In accordance with principles of this disclosure, and to address the problems of the prior art, a filter element is provided including a continuous construction of pleated media forming first and second opposing pleated media sections with an interior volume therein. The pleats of the first and second sections have portions of different pleat lengths. A support structure is within the interior volume supporting, absent an inner liner, the first and second media sections and is between the first and second media sections.

First and second opposite end caps may be secured to opposite ends of the first and second media sections.

The first and second media sections and the support structure may be configured such that an outer perimeter defined by outward facing portions of the first and second media sections and the support structure has two opposite domes joined by opposite flat sides.

The support structure may comprise a pleated construction having pleats extending in a direction non-parallel and angled relative to a direction of pleats of the pleated media sections.

The pleats of the pleated construction may extend at an angle 80-100 degrees relative to the direction of pleats of the pleated media sections.

The pleated construction may comprise a semi-rigid pleated screen.

The support structure may include at least a first wall of porous material oriented against the filter media in the interior volume; at least a second wall of porous material, spaced from and opposing the first wall, and oriented against the filter media in the interior volume; and the first wall and second wall being secured together in opposing relation.

In some embodiments, the support structure may include a plurality of molded spacers.

In some embodiments, the molded spacers are spaced from each other and are angled at a non-zero and non-perpendicular angle relative to the direction of pleats of the pleated media sections.

The support structure can be non-metal. Alternatively, the support structure may include at least a portion that is metal-conductive.

The support structure can extend a complete length between the first and second end caps. Alternatively, the support structure can extend less than a complete length between the first and second end caps.

The first end cap can be an open end cap. The second end cap can be a closed end cap.

The filter element can be free of an inner liner.

The pleated media sections can have inner pleat tips, and the inner pleat tips can be bonded to the support structure.

The pleated media sections may include bi-component filter media thermally bonded to the support structure.

The pleated media sections may include media pre-impregnated with epoxy thermally bonded to the support structures.

A method of filtering can include providing a filter element according to any of the previously characterized filter elements. The method can include directing fluid to flow through the pleated filter media sections; and while the fluid is flowing through the pleated filter media sections, supporting the filter media sections to prevent the filter media from collapsing together by using the support structure.

It is noted that there is no specific requirement that a feature, component, assembly, or method include all of the detail characterized herein in order to obtain some benefit according to the present disclosure.

DETAILED DESCRIPTION

A. Typical Systems of Operation

Figure 1:
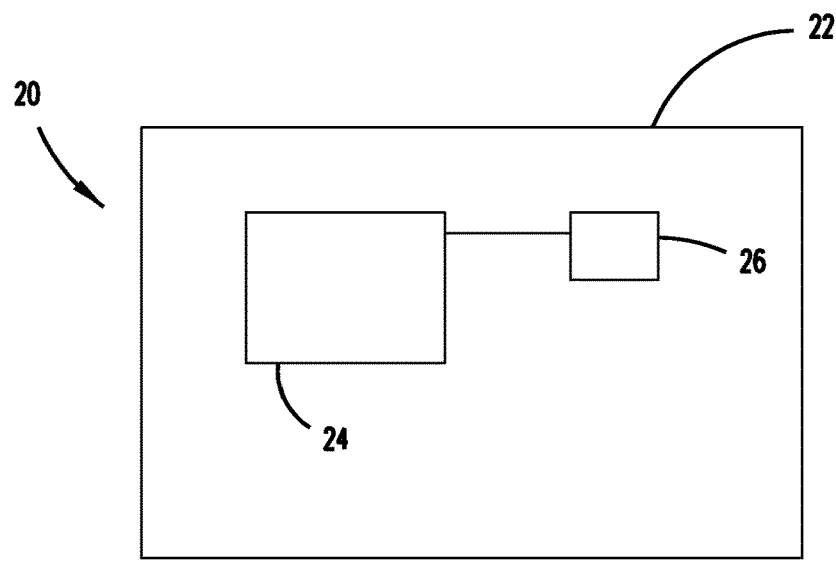
FIG. 1 is a schematic view of a typical system employing filters, constructed in accordance with principles of this disclosure.

In FIG. 1, a schematic diagram is illustrated showing a typical system and application for a filter assembly constructed in accordance with principles of this disclosure. In FIG. 1, a system is depicted at 20. The system will include machinery 22 having an engine 24. The machinery 22 can be an excavator, a skid steer motor, a lift truck, a tractor, an over the highway truck, a power boat, power plant, and other types of machines and equipment.

Machinery 22 will have engines 24 to power machinery 22 in a variety of sizes and power. Engine 24 will include a lube system, or a combustion system that requires filtration of the fluid. The fluid will be filtered by filter assembly 26.

Machinery 22 can also have hydraulic systems, in which the hydraulic fluid will need filtering or cleaning. These types of systems will use filter assembly 26 to clear the hydraulic fluid.

Figure 2:
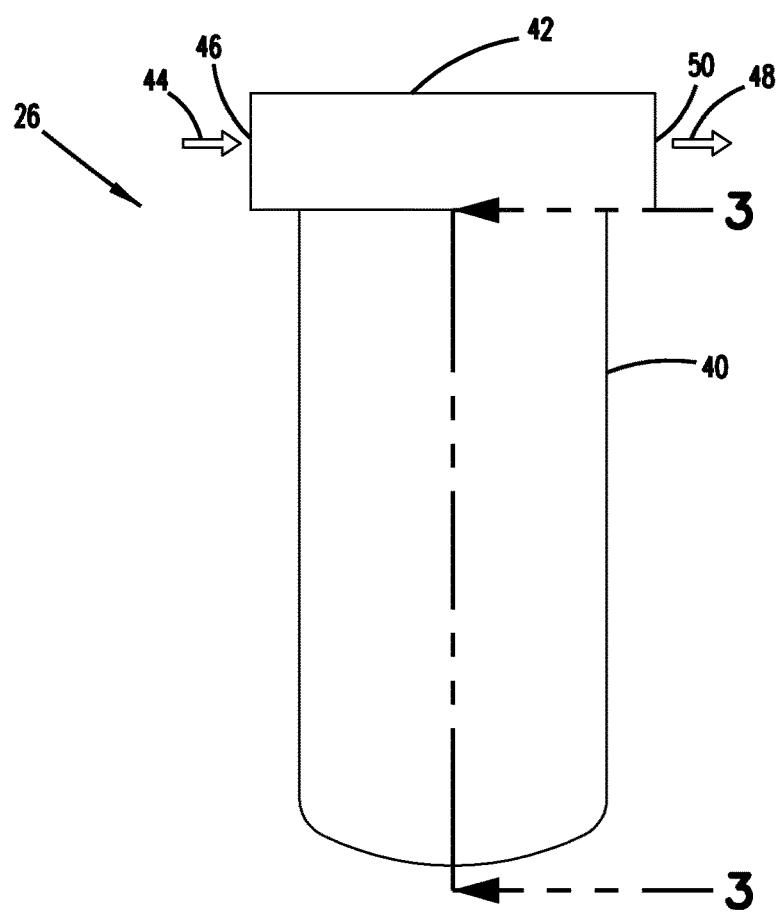
FIG. 2 is a schematic, front elevational view of one embodiment of a filter cartridge mounted on a filter head, constructed in accordance with principles of this disclosure.

In FIG. 2, a filter assembly 26 is illustrated schematically, in front elevation. The assembly 26 includes a fluid filter construction or cartridge 40 mounted on a filter head or base 42. Fluid to be filtered will generally enter filter head 42 in the direction of arrow 44 through inlet port 46. The fluid flow is directed through the cartridge 40 for filtering in a preferred manner as described herein. The filtered fluid then passes back into the filter head 42 and outwardly therefrom, in the direction indicated generally by arrow 48 through outlet port 50. The inlet port 46 and outlet port 50 are constructed, configured, and positioned appropriately for connection with suitable couplings and fluid flow conduits.

Figure 3:
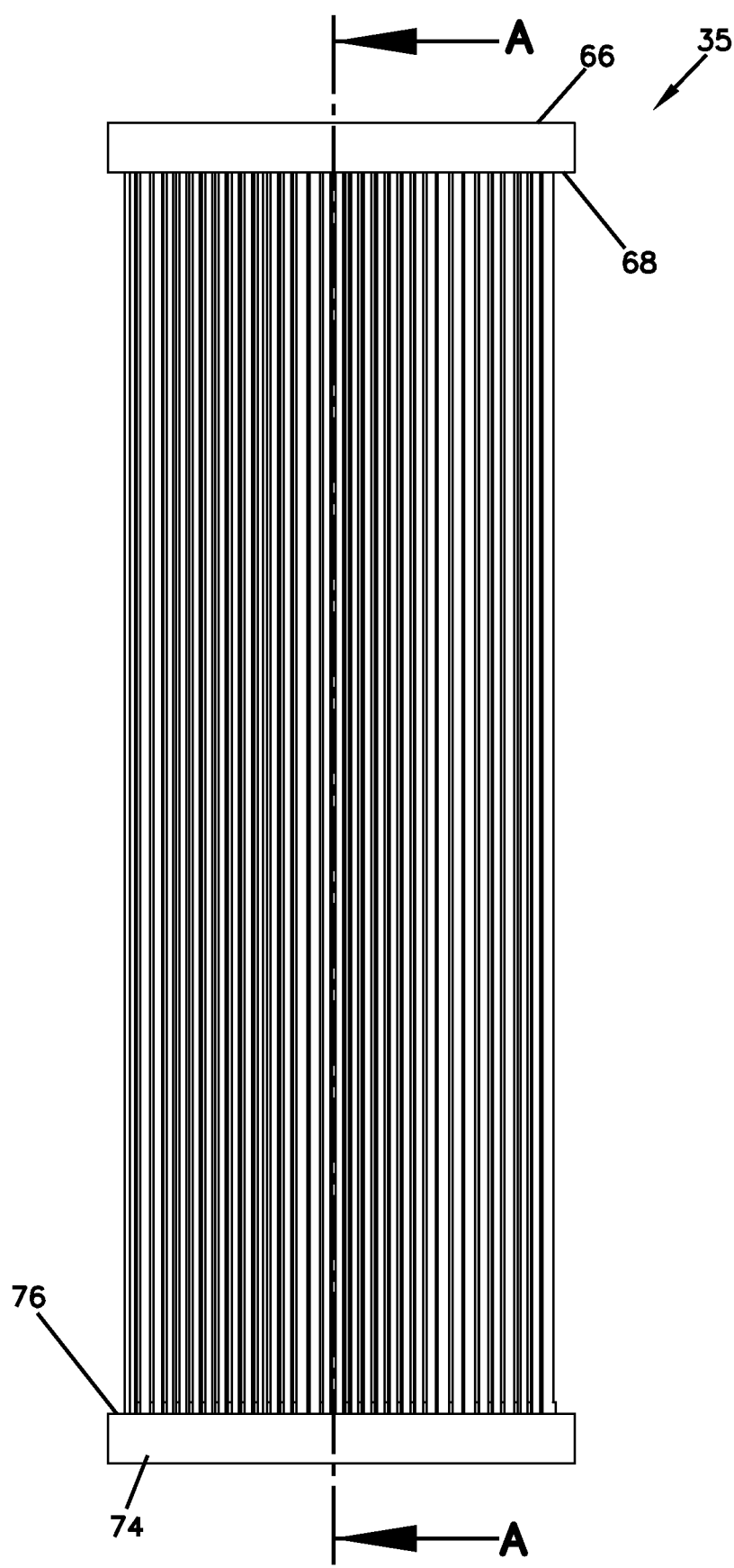
FIG. 3 is a front view of a filter element usable within the filter cartridge of FIG. 2.

Periodically, filter cartridge 40 is dismounted from filter head 42 for servicing. Typically, engagement between the filter cartridge 40 and the head 42 is threaded, with the cartridge 40 being a spin-on filter. The cartridge 40 can be removed and replaced. In alternative arrangements, the filter cartridge 40 has a reusable outer can or housing 30, with only a removable and replaceable filter element 35 (FIG. 3) therein. Such systems, in which the element 35 is removable from the housing or can 30 and replaceable are referred to as bowl-cartridge filters. The assemblies described herein apply to both spin-on assemblies and bowl-cartridge assemblies.

B. Improved Filter Elements, FIGS. 3-20

Filter elements 35 described herein address the problems in the prior art by being designed to use more filter media in a given volume, which will improve the service life. Various embodiments for achieving this result are described herein in FIGS. 3-20.

The filter element 35 includes a first pleated media section 52 and a second to contiguous pleated media section 54. The first and second pleated media sections are arranged relative to each other to be opposing one another and with a gap or space therebetween. In the gap or space between the first and second pleated media sections 52, 54 is at least a first support structure 56. The first support structure 56 is layered between the first and second pleated media sections 52, 54 and supports the first and second media sections 52, 54. This support by the first support structure 56 is accomplished absent reliance on an inner liner. While an inner liner can be used, preferably, in the described embodiments, the filter element 35 is inner liner-free.

By the term "inner liner" used in the context of being "absent an inner liner" or "inner liner-free", it is meant an inner liner of the typical prior art that is often perforated or expanded metal that lines or is in touching engagement with the inner pleat tips, usually extending the length of the media between opposite end caps, with such typical inner liners being only the outer surrounding wall and structure-free in the internal volume of the outer wall. Such typical prior art inner liners will often take the shape of the inner pleat tips, typically in a cylinder or oval form.

By the term "support(s)" in the context of use of "the first support structure 56 'supports' the first and second media sections 52, 54", it is meant that when subject to a pressure of 50 psi, the support prevents the inner volume (gap or space between the media sections 52, 54) from closing or reducing by greater than 50%. In situations where an inner liner is used, the "support" in this context is achieved without reliance on the inner liner.

In the embodiment of FIGS. 4-7, the filter element 35 further includes, in addition to the first and second media sections 52, 54, third and fourth opposing contiguous media sections 60, 62. The third and fourth media sections 60, 62 are made from pleated filter media and have a gap or volume therebetween. In the gap or volume is a second support structure 58.

The second support structure 58 cooperates with and is layered between the at third and fourth pleated media sections 60, 62. The second support structure 58 will support the third and fourth pleated media sections 60, 62 absent an inner liner. Again, while an inner liner can be used, the second support structure 58 will support the media without having to rely on an inner liner.

A third support structure 64 will support, absent an inner liner, the at least first, second, third, and fourth media sections 52, 54, 60, 62 and are layered therebetween. In the example shown, the fourth media section 62 and second media section 54 are adjacent and opposing each other with a gap or volume therebetween. In the gap or volume is the third support structure 64. The third support structure 64 is optional, and in some embodiments, no support structure occupies the gap or volume.

The first support structure 56, second support structure 58, and third support structure 64 may be constructed in accordance with the support structures described in U.S. patent application Ser. No. 14/521,811 filed Oct. 23, 2014, commonly assigned herewith, and incorporated by reference herein in its entirety. Examples of support structures usable with filter element 35 herein are shown and described in connection with FIGS. 21-27, below.

The filter element 35 includes a first end cap 66. The first end cap 66 is depicted as being secured to a first end 68 of the filter element. The first end 68 of the filter element 35 also corresponds to an end of the at least first and second media sections 52, 54. In embodiments that include third and fourth media section 60, 62, the first end cap 66 is secured to an end of those sections, as well.

Figure 4:
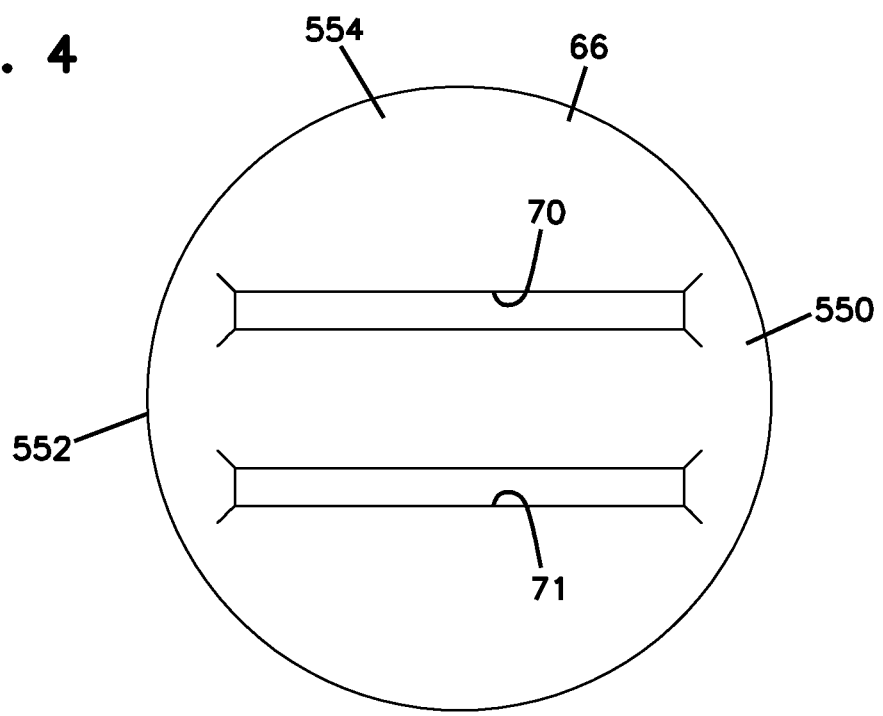
FIG. 4 is a first embodiment of a top view of the filter element of FIG. 3.
Figure 5:
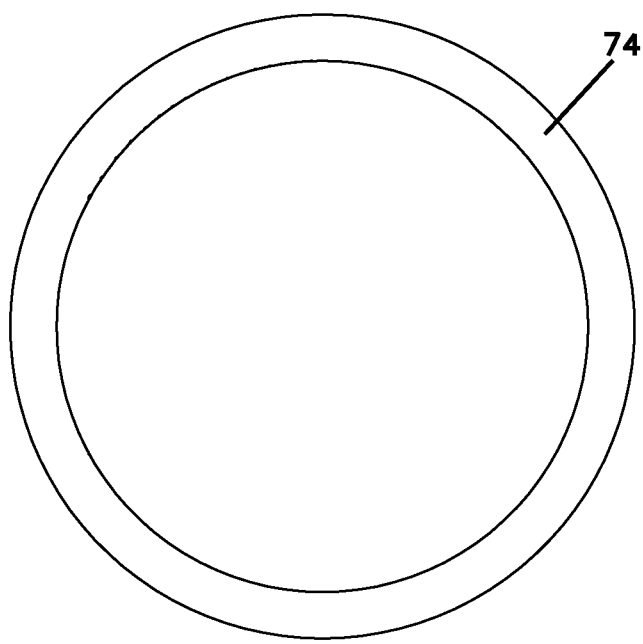
FIG. 5 is a bottom view of the filter element of FIG. 3.

In the embodiment shown in FIG. 4, the first end cap 66 includes fluid apertures or openings 70, 71. In the FIG. 4 embodiment, there are two openings 70, 71, which will allow for fluid flow either into or out of the element 35. In many preferred embodiments, the openings 70, 71 in the first end cap 66 will be outlet openings, in which filtered fluid will exit the element 35. In other embodiments, there can be fewer or more openings in the first end cap. Examples of these other arrangements are described further below.

The filter element 35 further includes a second end cap 74. The second end cap 74 will be secured to a second end 76 of the filter element 35. In the example of FIG. 4, the second end cap 74 is secured to the at least first and second media sections 52, 54 and if present, the third and fourth media sections 60, 62 and typically at an opposite end of the element 35 from the first end cap 66. In the embodiment shown in FIG. 5, and in many typical embodiments, the second end cap 74 will be a closed end cap with no flow openings therethrough. Alternatives are possible, including having an open end cap at the second end 76.

Figure 6:
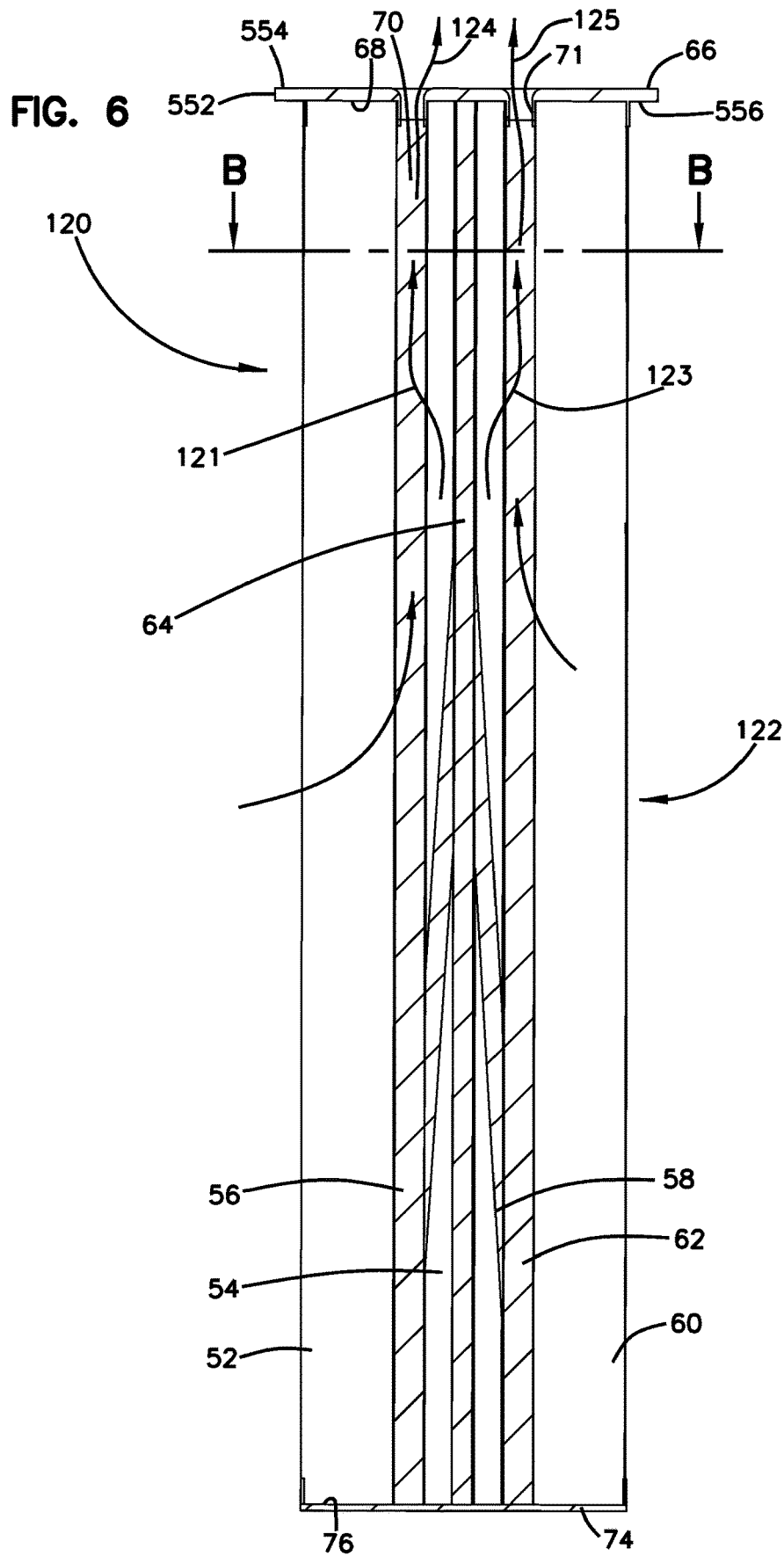
FIG. 6 is a schematic, cross-sectional view of a first embodiment of the filter element of FIG. 3, the cross-section being taken along the line A-A.
Figure 7:
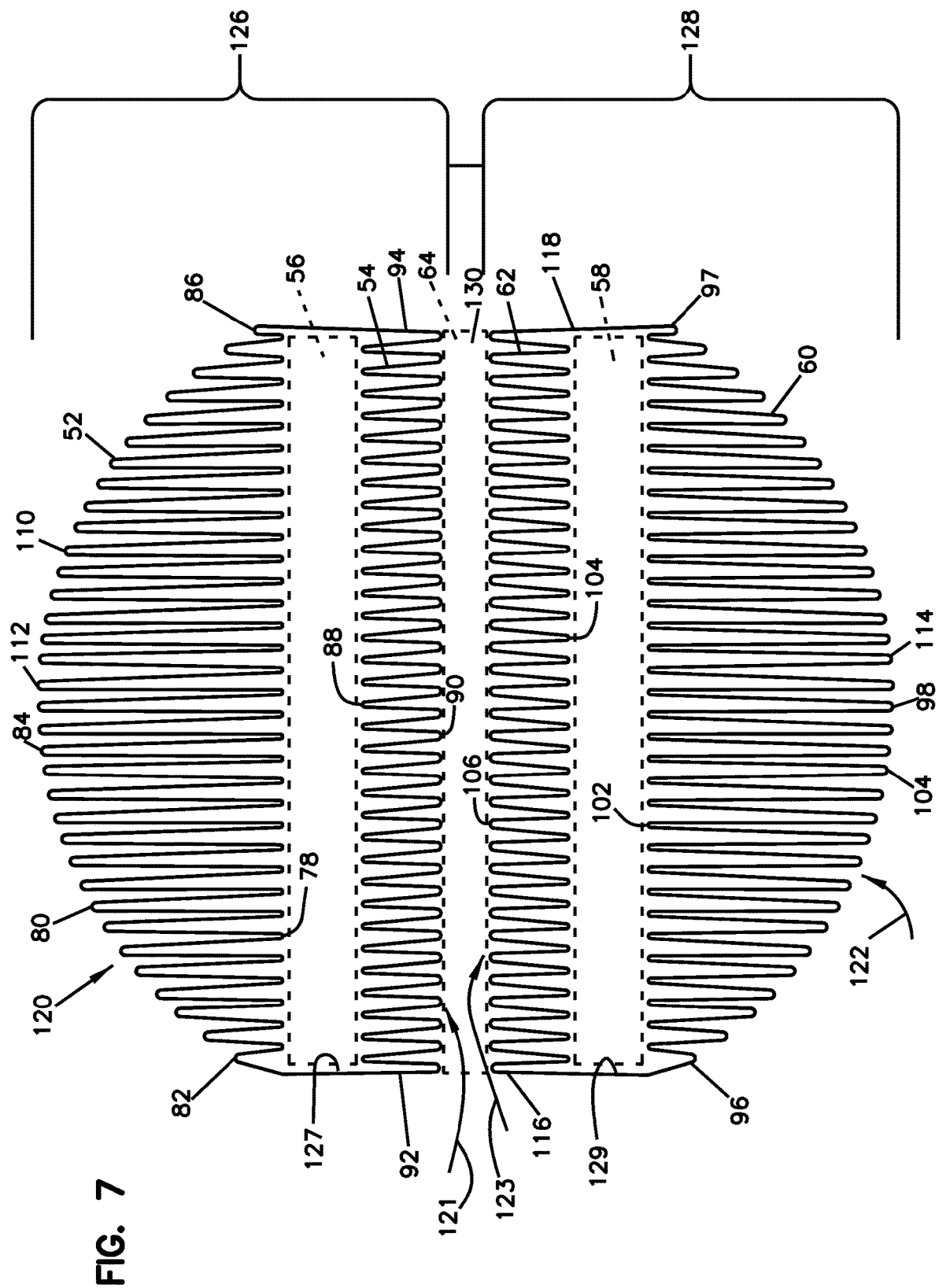
FIG. 7 is a first embodiment of a cross-sectional view of the filter element of FIG. 6, taken along the line B-B.

Attention is directed to FIG. 7. FIG. 7 is a first embodiment of a cross-sectional view of the filter element 35 of FIG. 6 and taken along the line B-B of FIG. 6. As can be appreciated from a review of FIG. 7, the first media section 52 has a varying pleat length as measured between the inner and outer pleat folds. For example, in FIG. 7, the inner pleat tips or pleat folds for the first pleated media section 52 are shown at 78, while the outer pleat tips or folds for the first pleated media section 52 are shown at 80. In FIG. 7, the pleat length as measured between the inner 78 and outer 80 pleat tips of the first pleated media section 52 increase in length starting from one edge 82 to form substantially an arc or a dome shape, which after peaking in length at 84, gradually decrease in length at an opposite edge 86.

Similarly, in FIG. 7, the second pleated media section 54 has a pleat length as measured between its inner pleat tips or folds 88 and outer pleat tips or folds 90. The inner pleat tips 88 are in opposing relation to the inner pleat tips 78 of the first pleated media section 52. The pleat length of the second pleated media section 54, as measured between inner pleat tips 88 and outer pleat tips 90 are substantially equal to each other with about a same length between opposite edges 92, 94.

As can be appreciated from a review of FIG. 7, the third media section 60 has a varying pleat length as measured between inner 102 and outer 104 pleat tips or folds. In FIG. 7, the pleat length as measured between the inner 102 and outer 104 pleat tips of the third pleated media section 60 increase in length starting from one edge 96 to form substantially an arc or a dome shape, which after peaking in length at peak 98, gradually decrease in length at an opposite edge 97.

The fourth media section 62 has inner pleat tips or folds 104 and outer pleat tips or folds 106. The inner pleat folds 104 are in opposing relation to the inner pleat folds 102 of the third pleated media section 60. There is a gap or volume between the inner folds 102 and 104 to holds the second support structure 58. The outer pleat folds 106 are in opposing relation to the outer pleat folds 90 of the second media section 54 with a gap therebetween to hold the third support structure 64. The lengths of the pleats of the fourth media section 60, as measured between inner pleat folds 104 and outer pleat folds 106 are substantially a same length. In the embodiment of FIG. 7, the pleat folds of the fourth media section 62 have about the same length of the pleat folds as the second media section 54, although alternatives are possible.

It can be appreciated that in the embodiment of FIG. 7, the overall media is arranged to fill the volume of a generally round element 35, when looking at the cross-section. In FIG. 7, the first media section 52, second media section 54, third media section 60, fourth media section 62, first support structure 56, second support structure 58, and third support structure 64 are configured such that an outer perimeter 110 defined by the outward facing portions of the first media section 52, second media section 54, third media section 60, fourth media section 62, first support structure 56, second support structure 58, and third support structure 64 has two opposite domes 112, 114 joined by opposite flat sides 116, 118. In general, the dome 112 has an outwardly most extending portion at peak 84, while dome 114 has an outwardly extending portion at peak 98. The flat side 116 is along outer edges 82, 92, 96 while the flat side 118 is along outer edges 86, 94, 97.

In preferred embodiments, the first pleated media section 52 and the second pleated media section 54 are one continuous section of pleated media, with no sections of discontinuous media. Similarly, the third pleated media section 60 and the fourth pleated media section 62 are one continuous piece of media, with no breaks or discontinuities therein.

An example of fluid flow path for the filter element 35 of FIGS. 6 and 7 can be seen at arrows 120, 121, 122, and 123. Unfiltered fluid flows into the first pleated media section 52 at arrow 120 and into the second pleated media section 54 at arrow 121. Unfiltered fluid flows into the third pleated media section 60 at arrow 122 and into the fourth pleated media section 62 at arrow 123. Unfiltered fluid that flows into the second pleated media section 54 or the fourth pleated media section 62 first flows, unfiltered, into the third support structure 64. The unfiltered fluid then flows through each of these pleated media sections 52, 54, 60, 62 and then into one of the first support structure 56 or second support structure 58 before exiting the filter element 35 shown by arrows 124, 125 through one of the end cap openings 70, 71. There is an open volume or gap allowing the unfiltered fluid to flow from the filter head 42 and into the can or housing 30 surrounding the filter element 35.

FIGS. 7-12 each represent an example embodiment of the filter element 35 taken at cross-section B-B of FIG. 6. In each of these embodiments, the first and second pleated media sections 52, 54 are a continuous pleated media section forming a first media racetrack 126 with a first interior volume 127. The first support structure 56 is operably oriented in the first interior volume 127. By the term "racetrack", it is meant that the shape forms a closed loop, is non-circular, and is generally longer than it is wide. Other variations are possible.

The third and fourth media sections 60, 62 are a continuous pleated media section forming a second media racetrack 128 with a second interior volume 129. The second support structure 58 is operably oriented in the second interior volume 129.

As can be appreciated from a review of FIGS. 7-12, the first racetrack 126 is spaced from the second racetrack 128 with a third interior volume 130 therebetween. In some embodiments a third support structure 64 is operably oriented in the third interior volume 130. In other embodiments, no support structure occupies the third interior volume 130.

Figure 8:
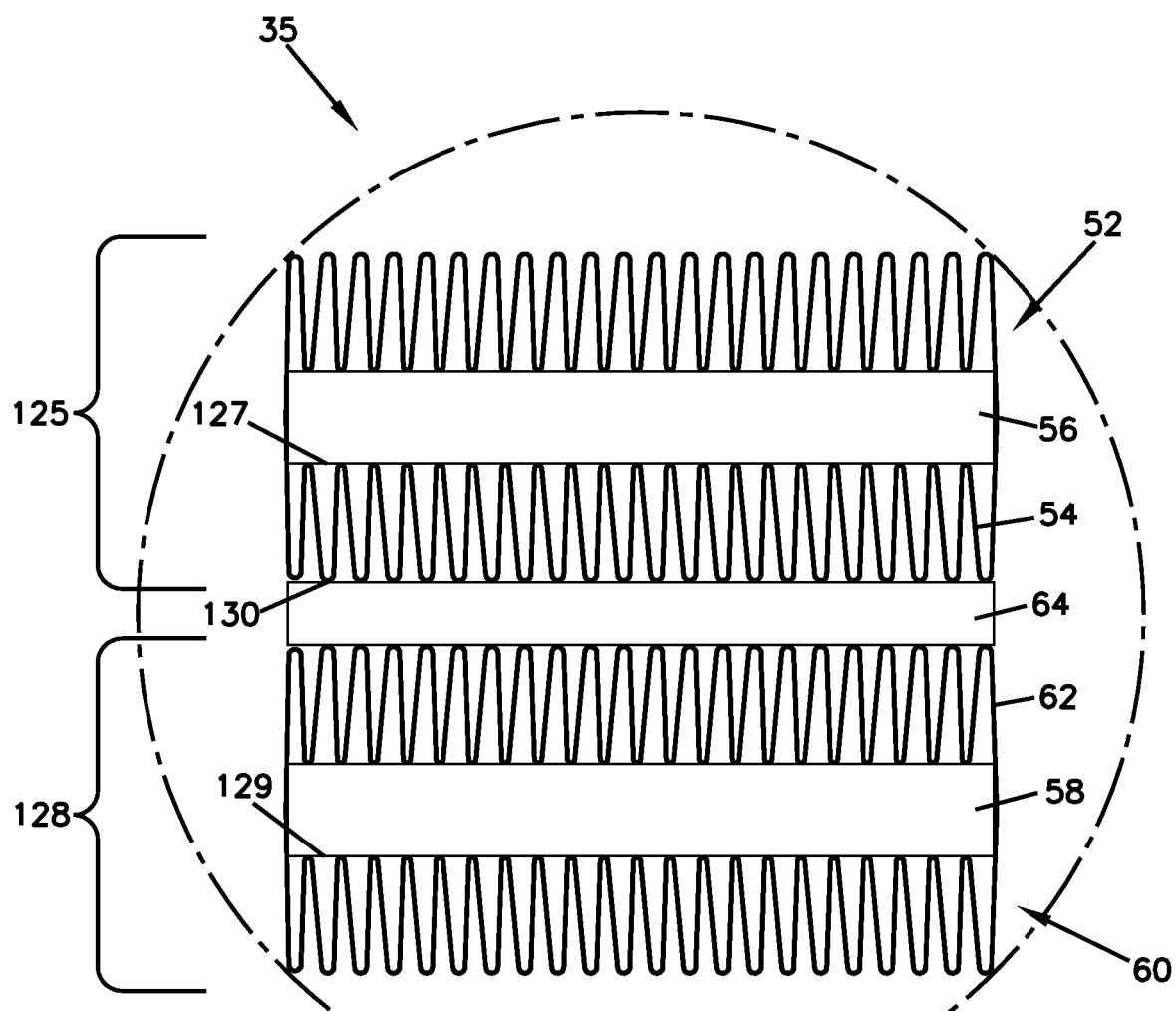
FIG. 8 is another embodiment of the cross-section B-B of FIG. 6.

In the embodiment of FIG. 8, the pleat lengths the pleats of the first media section 52, as measured between the inner 78 and outer 80 pleat folds; and the pleat lengths of the pleats of the second media section 54, as measured between the inner 88 and outer 90 pleat folds, are substantially the same length. Further, in embodiments in which the first media section 52 and second media section 54 are joined, they can be joined by, for example, a straight section of media or a continuous arc of pleats.

Still in reference to FIG. 8, the pleat length of the third media section 60, as measured between the inner 102 and outer 104 pleat folds; and the pleat lengths of the pleats of the fourth media section 62, as measured between the inner 104 and outer 106 pleat folds, are substantially the same length. Further, in embodiments in which the third media section 60 and fourth media section 62 are joined, they can be joined by, for example, a straight section of media or a continuous arc of pleats.

While many embodiments are possible, in the particular one shown in FIG. 8, the lengths of the pleats of each of the first pleated media section 52, second media section 54, third pleated media section 60, and fourth media section 62 are all about equal in length to each other.

Figure 9:
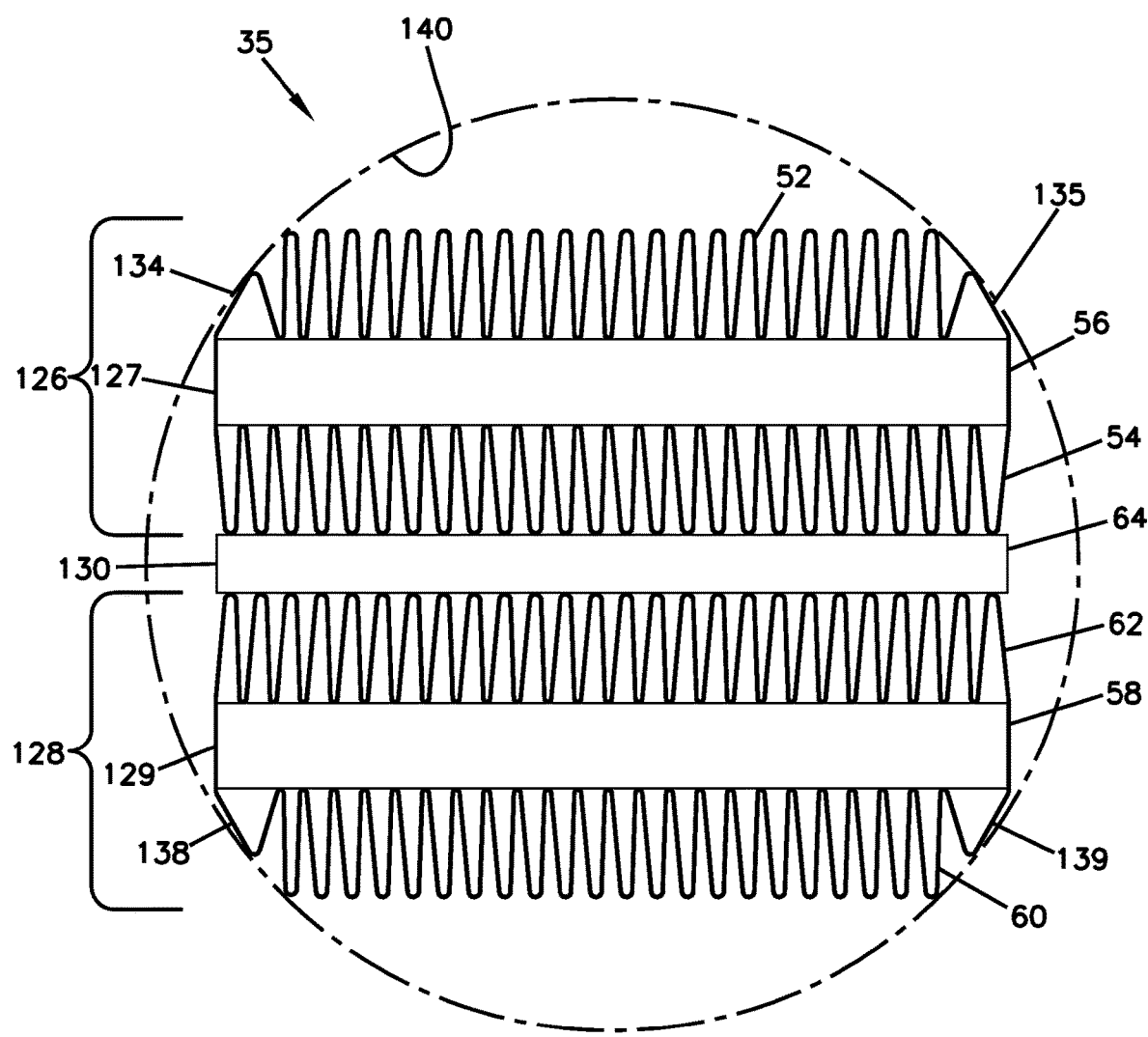
FIG. 9 is another embodiment of the cross-section B-B of FIG. 6.

In the embodiment of FIG. 9, the lengths of the pleats, as measured between the respective inner and outer pleat tips of each of the media sections 52, 54, 60, 62 are substantially the same, with an exception at end portions 134, 135 of the first racetrack 126 and end portions 138, 139 of the second racetrack 128. In this embodiment, the end portions 134, 135, 138, 139 have pleat lengths that shorten to conform to the shape of the inner wall 140 of the can or housing 30. Thus, in embodiments where the can or housing 30 are cylindrical, having a circular cross-section, as the end portions 134, 135, 138, 139 of the first and second racetracks 126, 128 approach the inner wall 140, the lengths become shorter in order to fit media in that volume, but without bunching or masking. Thus, as can be seen in FIG. 9, the end portions 134, 135, 138, 140 have pleats with a pleat length that is shorter than remaining sections of the racetracks 126, 128. In addition or in alternative to having shorter pleats at the end portions 134, 135, 138, 139, there can be fewer pleats in these regions.

Figure 10:
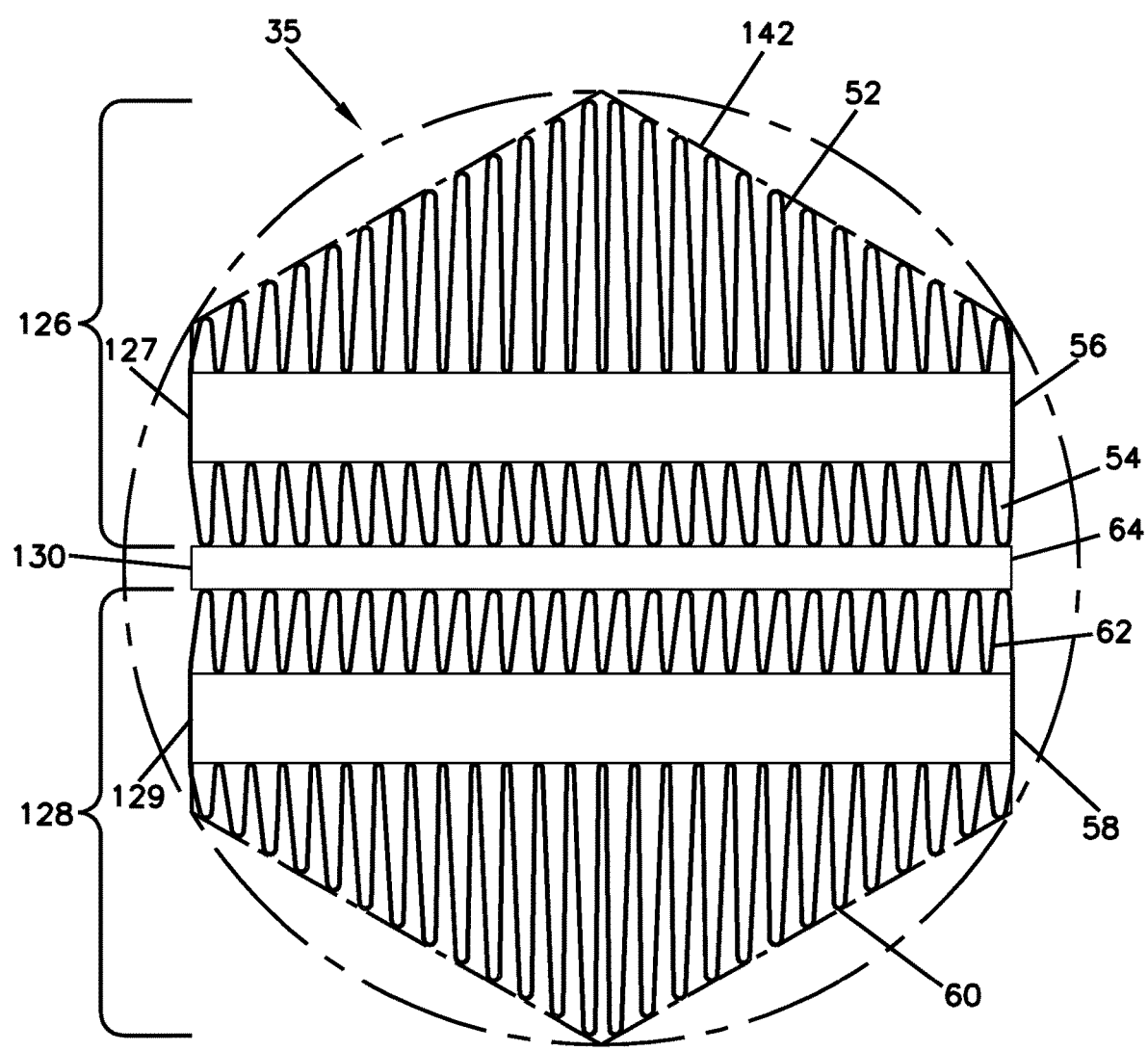
FIG. 10 is another embodiment of the cross-section B-B of FIG. 6.
Figure 11:
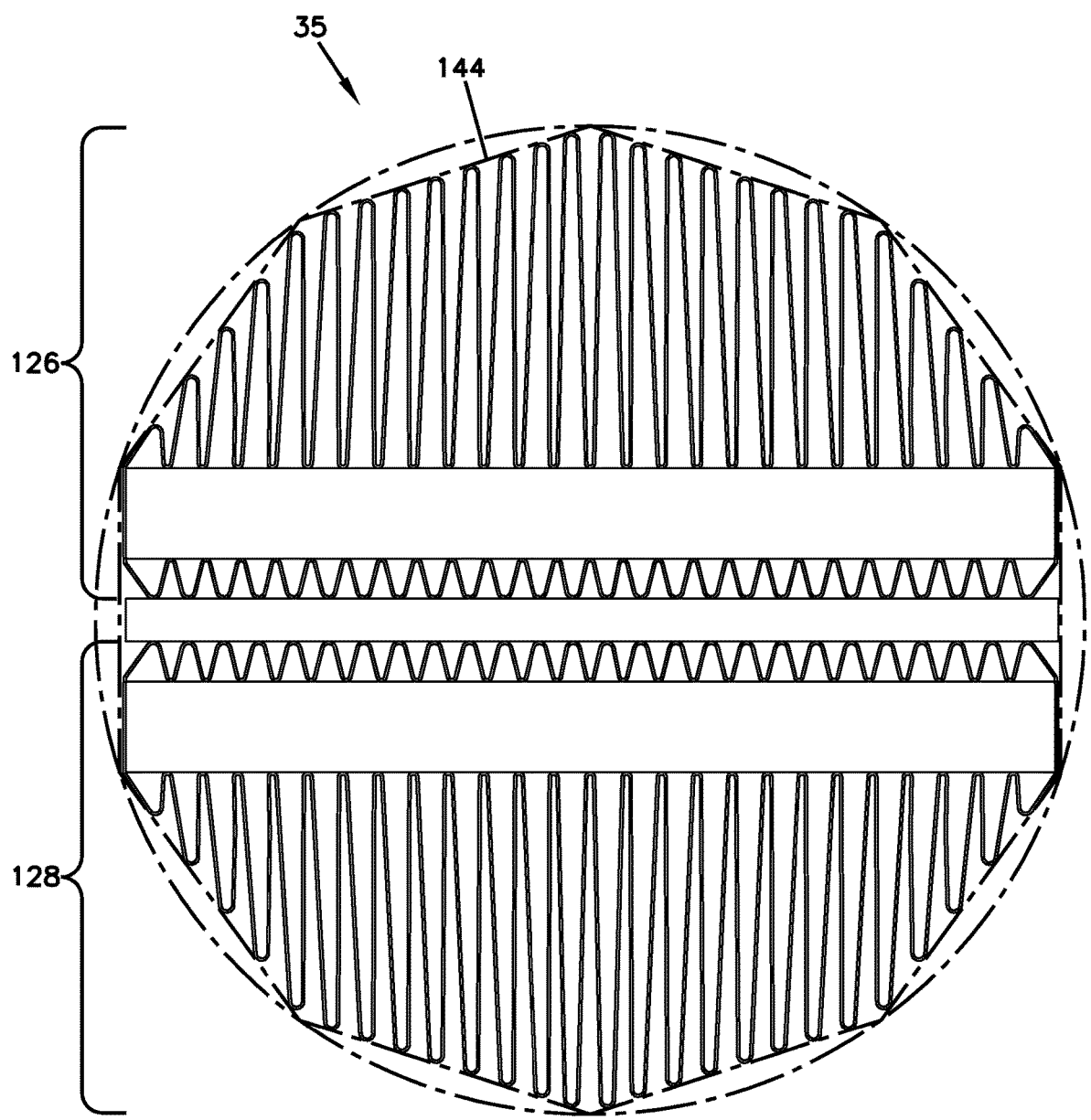
FIG. 11 is another embodiment of the cross-section B-B of FIG. 6.
Figure 12:
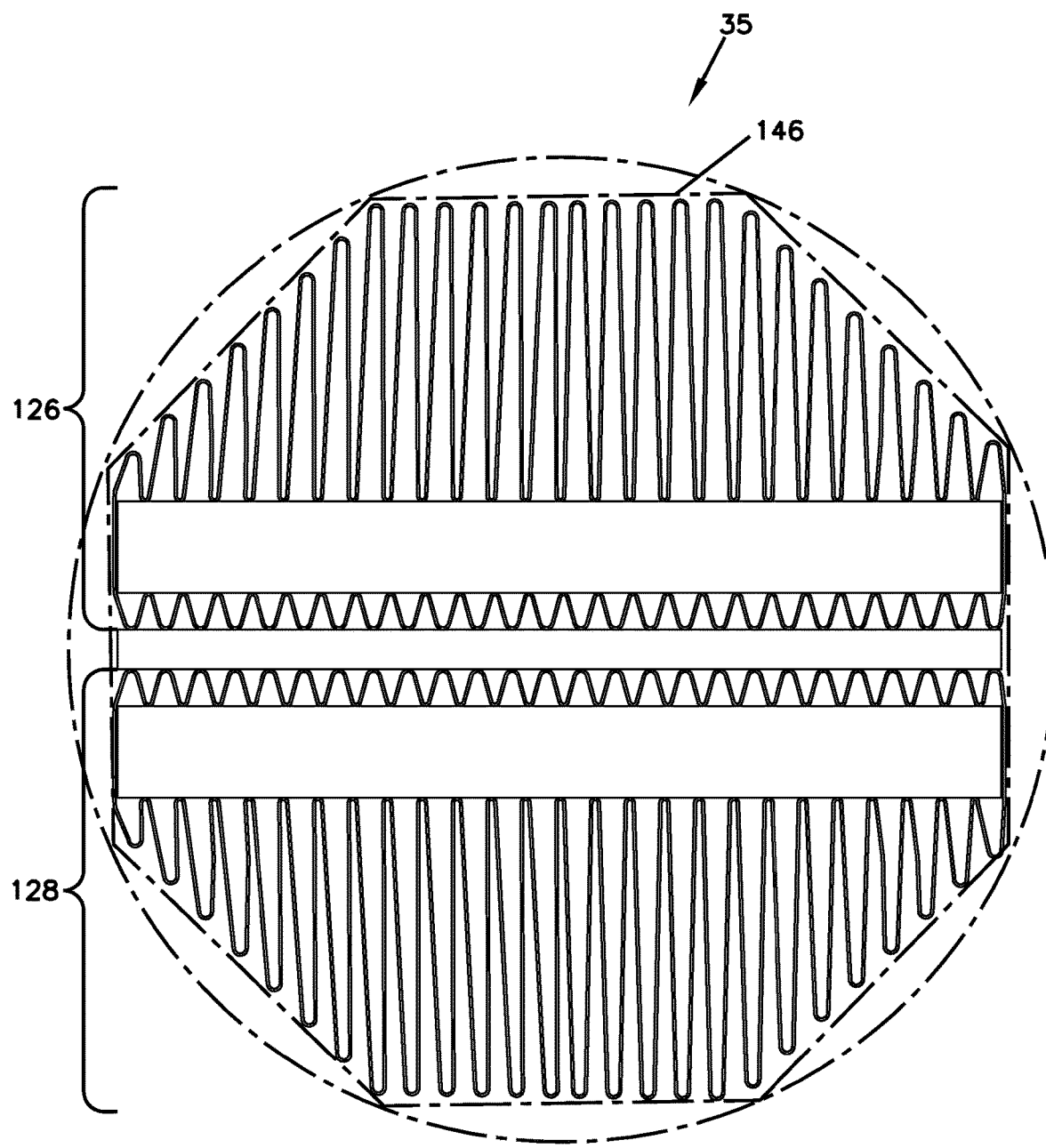
FIG. 12 is another embodiment of the cross-section B-B of FIG. 6.

Attention is directed to the embodiments of FIGS. 10-12. The lengths of the pleats of at least the first pleated media section 52 and third pleated media section 60 can be adjusted in length to conform to the inner wall 40 of the can or housing 30. In the embodiment of FIGS. 10-12, the first, second, third, and fourth media sections 52, 54, 60, 62 and the first, second, and third support structures 56, 58, 64 are configured such that the outer perimeter 110 defined by the outward facing portions of the first, second, third, and further media sections 52, 54, 60, 62 and the first, second, and third support structures 56, 58, 64 is polygonal in shape. The polygon shape can be a regular polygon, or an irregular polygon.

In FIG. 10, the filter element 35 has a polygon shape that is a hexagon 142.

In FIG. 11, the polygon shape is a decagon 144.

In FIG. 12, the polygon shape is an octagon 146. It should be appreciated that the polygon shape can include any multisided shape.

Figure 13:
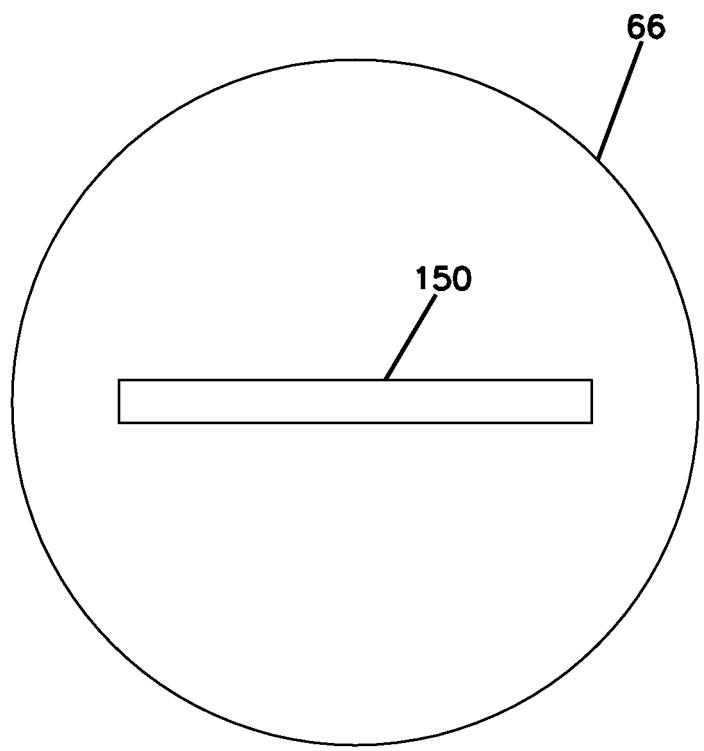
FIG. 13 is another embodiment of a top view of the filter element of FIG. 3, the view being similar to the view of FIG. 4, but depicting an alternate embodiment in which the first end cap has only a single opening instead of the two openings of FIG. 4.

FIG. 13 is the top view of another embodiment of filter element 35. This view is similar to the view of FIG. 4, and it depicts an alternate embodiment. The first end cap 66 is viewable, and in this embodiment, the first end cap 66 has only a single opening 150.

Figure 14:
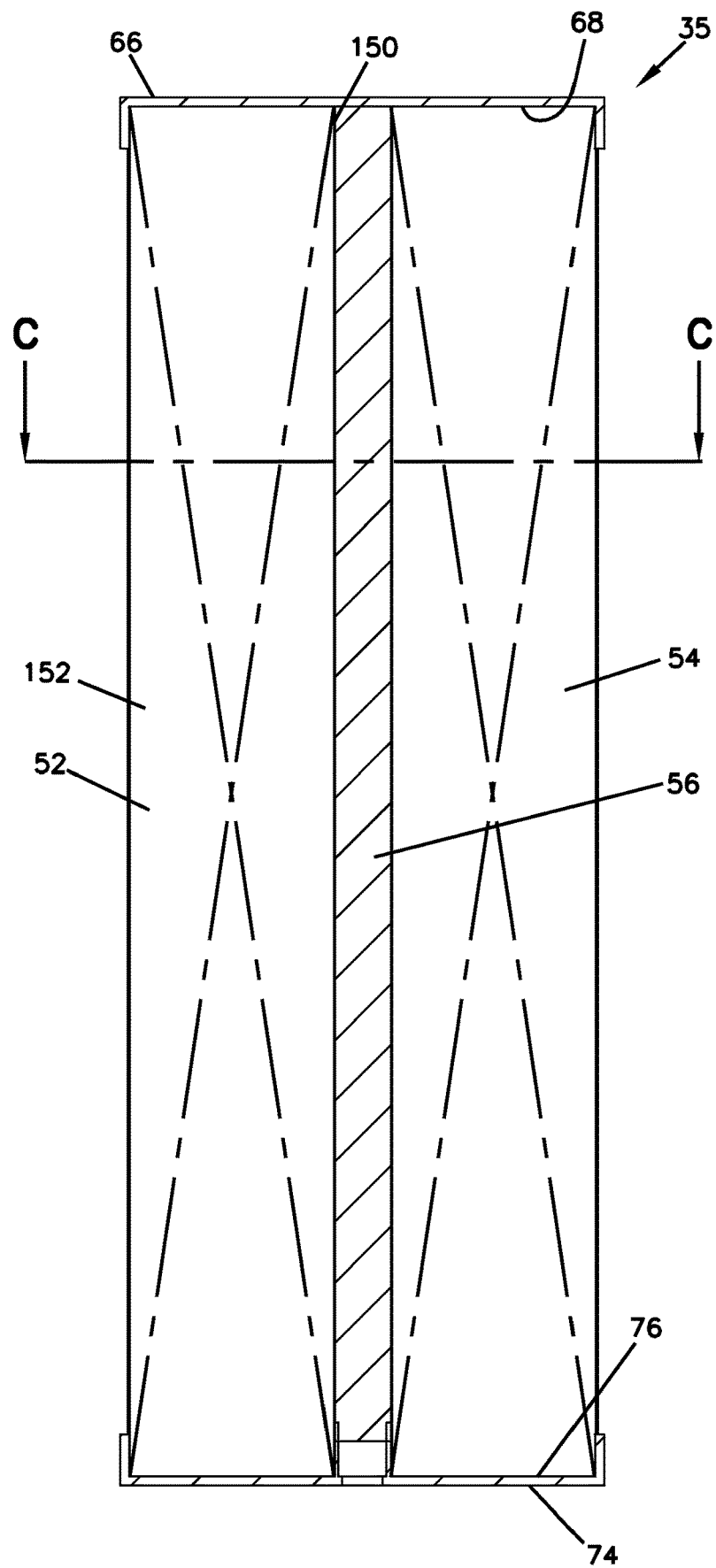
FIG. 14 is another embodiment of the cross-section of the element of FIG. 3 taken along the line A-A.

FIG. 14 is a schematic, cross-sectional view of the filter element 35 of the one depicted in FIG. 13. The filter element 35 of FIGS. 13-15 includes a continuous construction of pleated media 152, with only one seam as opposed to two sections of media with two seams. The continuous construction of pleated media 152 forms the first and second opposing pleated media sections 52, 54 with interior volume 155 (FIG. 15) therein. First support structure 56 is within the interior volume 155 supporting, absent an inner liner, the first and second media sections 52, 54 and being between the first and second media sections 52, 54.

As with the other embodiments, the first pleated media section 52 includes inner pleat tips or folds 78 and outer pleat tips or folds 80. The second media section 54 includes inner pleat tips or folds 88 and outer pleat tips or folds 90. The length of the pleats, as measured between the respective inner and outer pleat folds 78, 80 and 88, 90 have portions of different length. For example, in the embodiment of FIG. 15, the length of the pleats increase starting from edge 82 to form substantially an arc, which after peaking in length at 84, gradually decreases in length at opposite edge 86. Similarly, the second pleated media section 54 has pleat length, as measured between inner pleat tips 88 and outer pleat tips 90 that increase in length starting from edge 92 to form an arc, which peaks in length at portion 157 and then gradually decreases in length to opposite edge 94.

Figure 15:
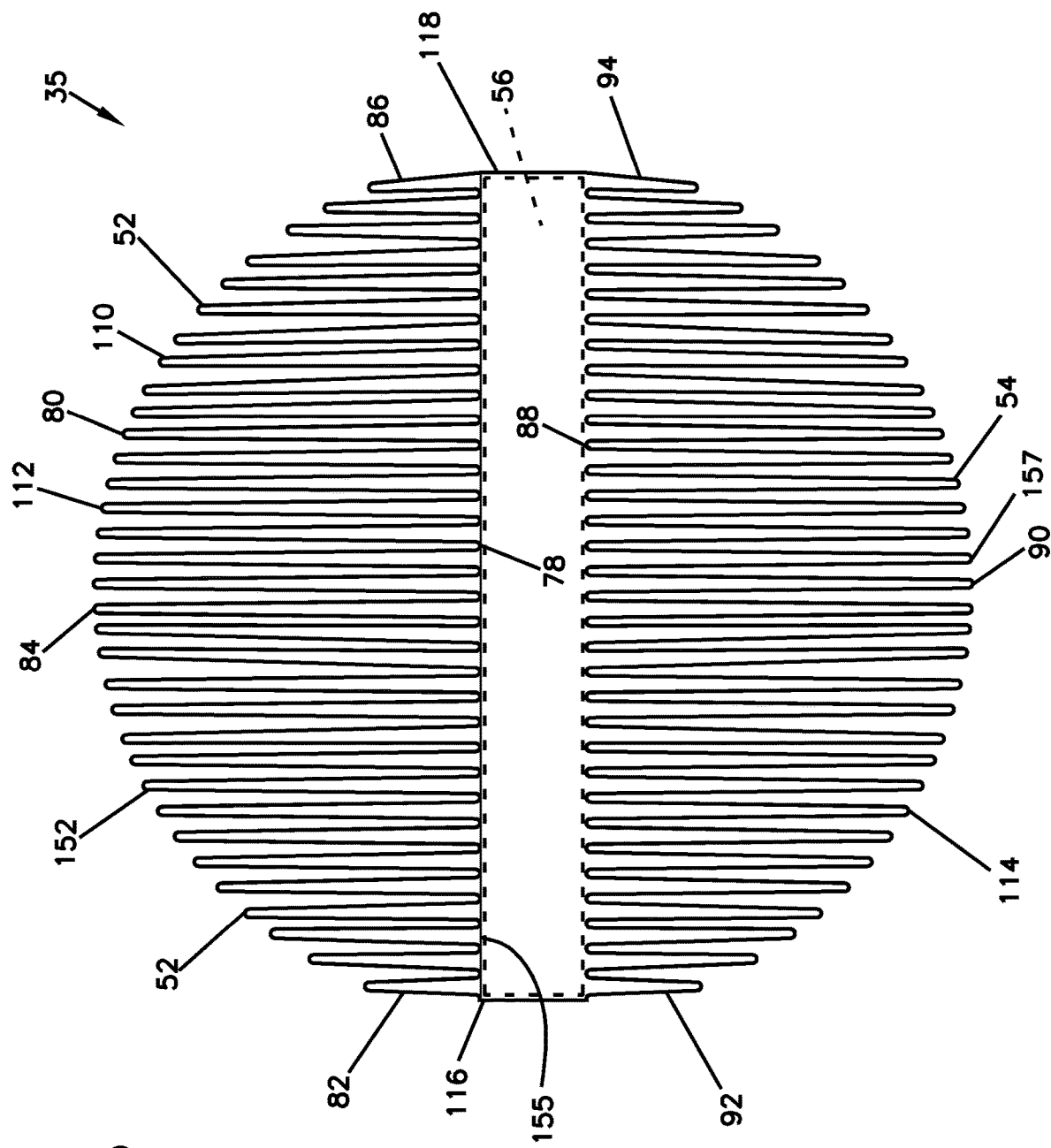
FIG. 15 is a schematic, cross-sectional view of a portion of the filter element of FIG. 14, the cross-section being taken along the line C-C.

In the embodiment of FIG. 15, the filter element 35 is generally symmetrical, with the first pleated media section 52 and the second pleated media section 54 being a mirror-image of each other. The preferred construction for the element 35 of FIGS. 14 and 15 is one single, continuous piece of media 152, so that there are no breaks or gaps in the media, including along the edges 82, 92, 86, 94 that bridge the gap defined by the volume 155. The "continuous piece" of media 152 can include a strip of media secured together at a single joining seam.

The first and second media sections 52, 54 and the support structure 56 are configured such that the outer perimeter 110 defined by outward facing portions of the first and second media sections 52, 54 and the support structure 56 has two opposite domes 112, 114 joined by opposite flat sides 116, 118. The flat side 116 includes edges 82, 92. The flat side 118 includes edges 86, 94.

Figure 16:
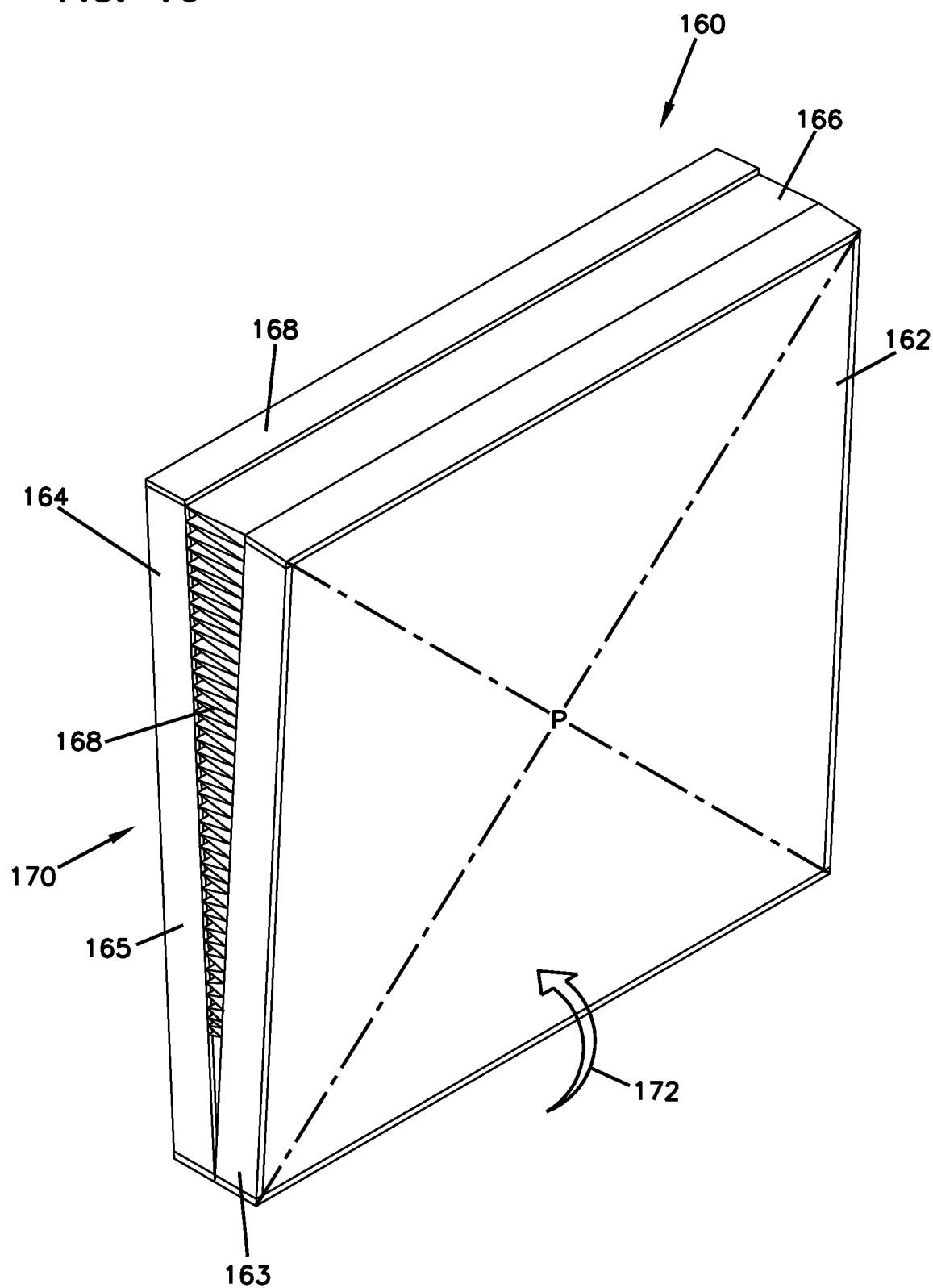
FIG. 16 is a schematic, perspective view of another embodiment of a filter element, constructed in accordance with principles of this disclosure.
Figure 17:
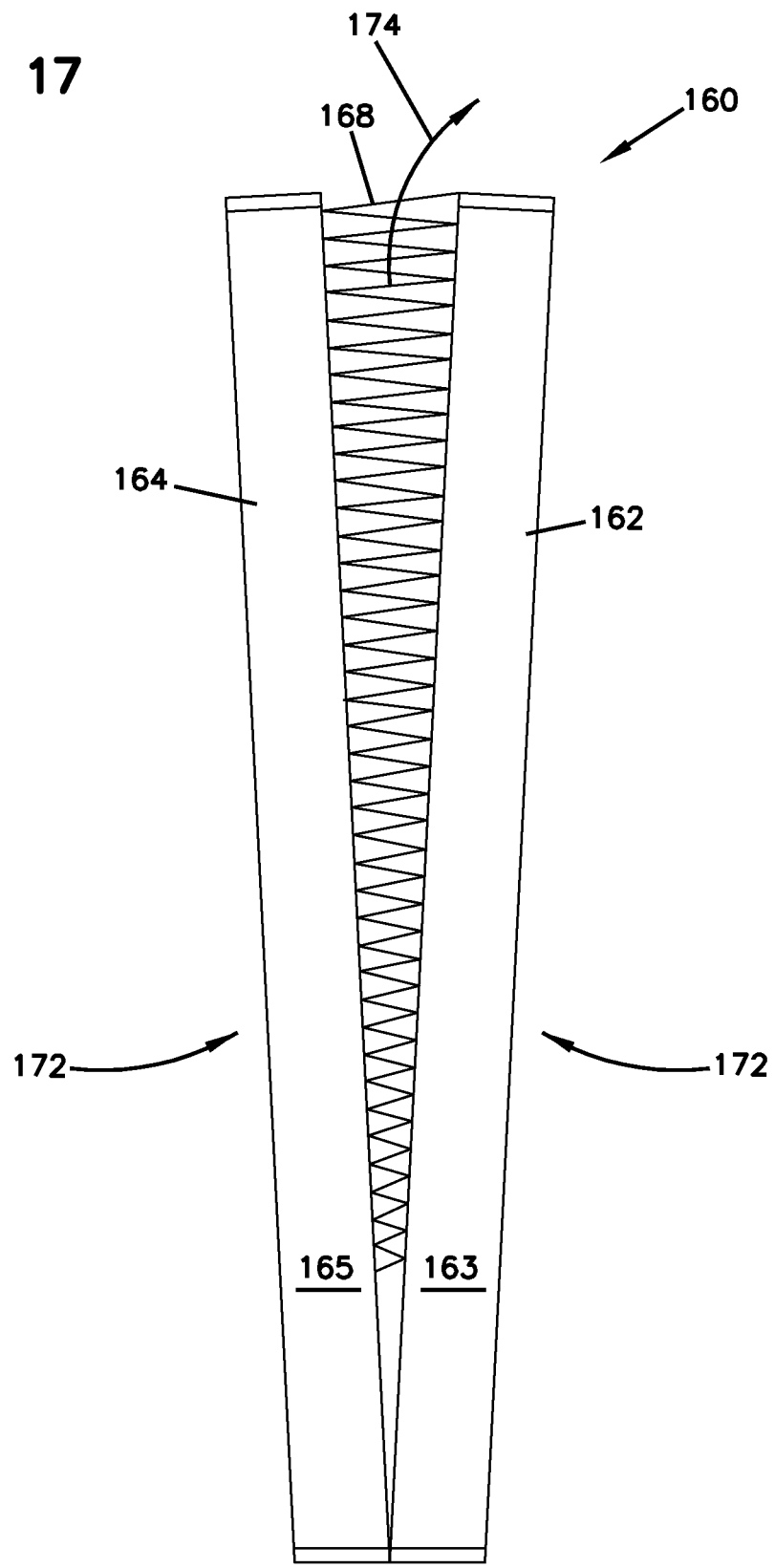
FIG. 17 is an end view of the filter element of FIG. 16.

Another embodiment of a filter element is illustrated in FIGS. 16 and 17 at 160. In this embodiment, there is a first pleated media section 162 and an opposing second pleated media section 164 (FIG. 17). Between the first and second pleated media sections 162, 164 is an open volume 166. Oriented in the volume 166 is first support structure 168. The first support structure 168 supports the first and second media sections 162, 164, absent an inner liner as previously defined. The sides of each of the media sections 162, 164 are covered or sealed with end panels 163, 165. In use, the volume between the end panels 163, 165 (and at the opposite end of the media sections 162, 164) would also be covered with an end panel to prevent air flow from bypassing the media sections 162, 164, but the end panel that would cover that volume is omitted from this view to allow the support structure 168 to be seen.

The first and second media sections 162, 164 form a first media V-pack 170. As can be seen in FIG. 17, the first and second media sections 162, 164 form a V-shape, with the first support structure 168 taking a wedge-shape to accommodate the expanding interior volume 166 as the media sections 162, 164 gradually move apart from each other.

In general, air to be filtered will flow into the media at arrows 172 and then flow into the first support structure 168 to exit the arrangement through the support structure 168 at arrow 174.

Figure 18:
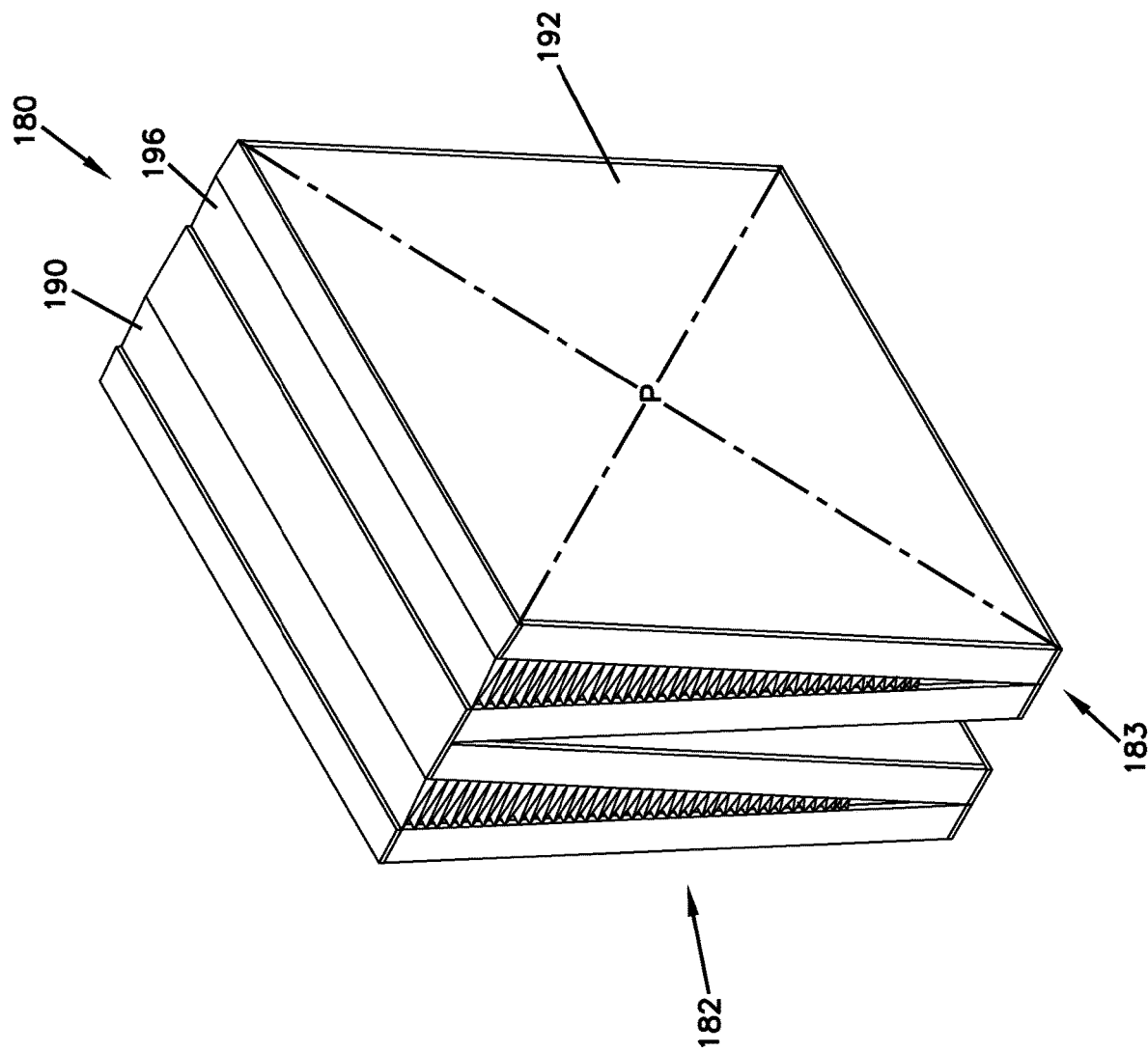
FIG. 18 is a perspective view of another embodiment of a filter element, constructed in accordance with principles of this disclosure.
Figure 19:
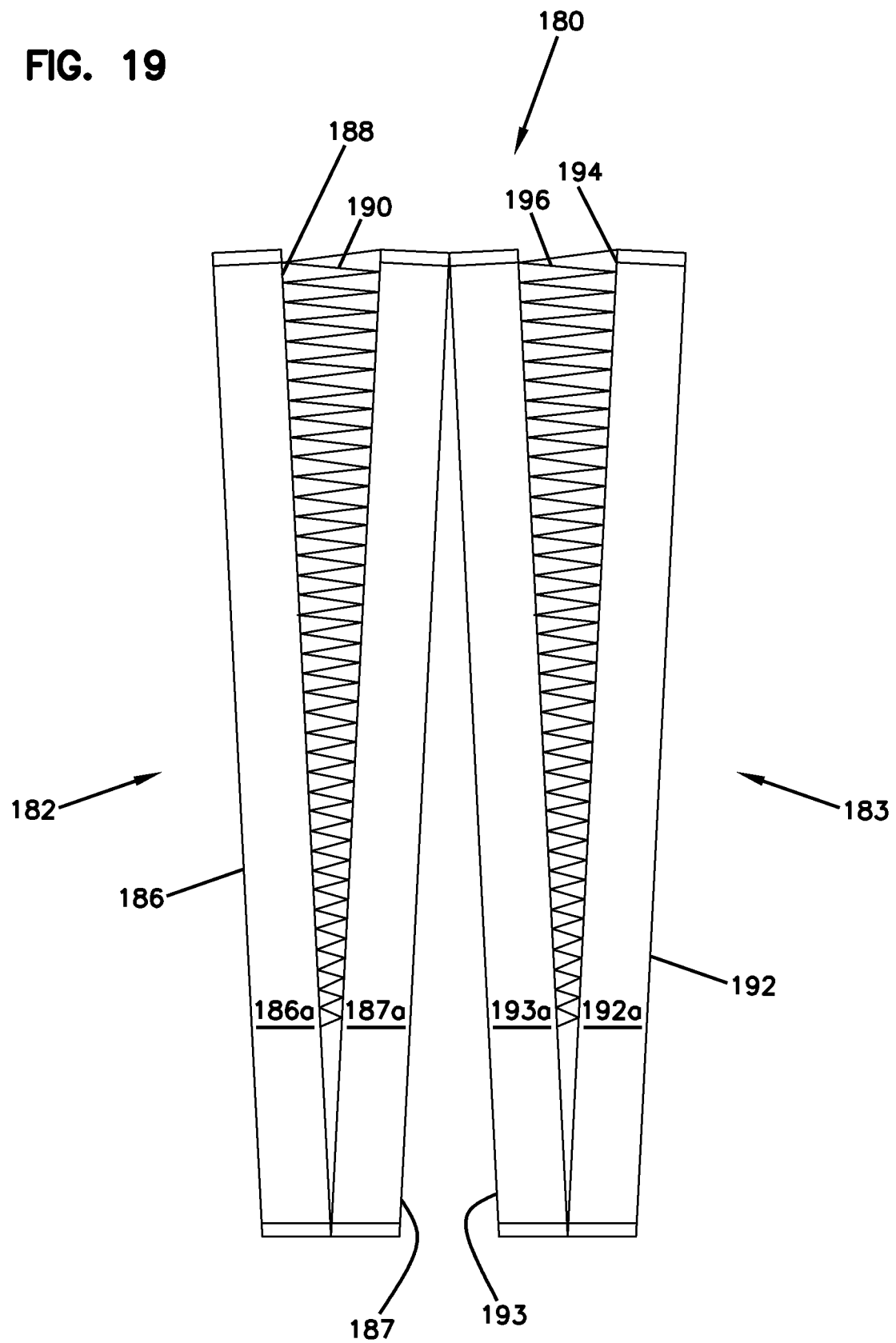
FIG. 19 is an end view of the filter element of FIG. 18.

FIGS. 18 and 19 show another embodiment of an element 180 utilizing the principles described herein. Element 180 includes first and second adjacent V-packs 182, 183.

The first V-pack 182 includes first and second pleated media sections 186, 187 in opposing relationship to each other with open volume 188 therebetween. The pleated media sections 186, 187 have their ends covered or sealed with end panels 186a, 187a. Within the volume 188 is first support structure 190. The first support structure 190 is operably oriented in the volume 188 and supports, absent an inner liner, the first and second media sections 186, 187. In use, the volume between the end panels 186a, 187a (and at the opposite end of the media sections 186, 187) would also be covered with an end panel to prevent air flow from bypassing the media sections 186, 187, but the end panel that would cover that volume is omitted from this view to allow the support structure 190 to be seen.

The second V-pack 183 includes first and second pleated media sections 192, 193 opposing each other and defining a wedge-shaped open volume 194 therebetween. The pleated media sections 192, 193 have their ends covered or sealed with end panels 192a, 193a Oriented in the wedge-shaped volume 194 is a second support structure 196. The second support structure 196 supports, absent an inner liner, the third and fourth media sections 192, 193. In use, the volume between the end panels 192a, 193a (and at the opposite end of the media sections 192, 193) would also be covered with an end panel to prevent air flow from bypassing the media sections 192, 193, but the end panel that would cover that volume is omitted from this view to allow the support structure 196 to be seen.

In the embodiments of FIGS. 16-19, the length of the pleats, as measured between inner and outer pleat tips or folds is substantially the same for each of the pleated media sections.

Figure 20:
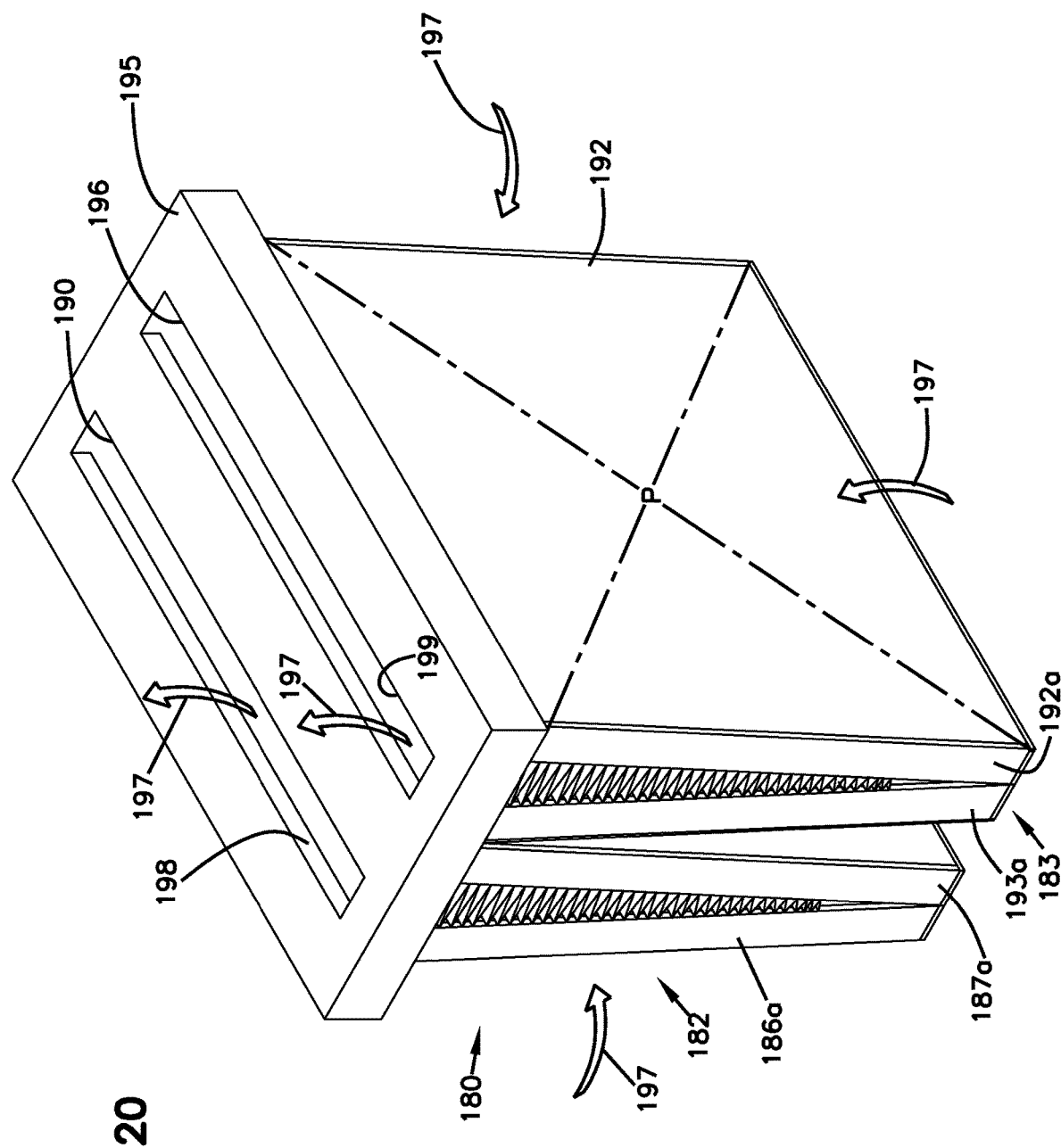
FIG. 20 is a perspective view of the element of FIGS. 18 and 19 incorporated with a seal member for orienting in a filter housing.

FIG. 20 is an example embodiment of the element 180 of FIGS. 18 and 19 sealed against a tubesheet 195 in a housing. There is typically a seal member oriented at the wide ends of the V-packs 182, 183 and surrounding the volumes 188, 194 and support structures 190, 196. When the element 180 is operably mounted in a housing or against tubesheet 195, a seal is created between the seal member and the housing seal surface or tubesheet 195. This seal will prevent fluid flow from bypassing the media sections 186, 187, 192, 193 so that fluid must pass through a section of the media for filtration before flowing into one of the support structures 190, 196 and then out of the element through exit opening 198, 199. Again, in use, the ends of the V-packs adjacent to the support structures 190, 196 would also be covered to prevent fluid from bypassing the media and flowing directly into the support structures 190, 196, but those covers are omitted from this view to allow showing of the support structures 190, 196. Example fluid flow is illustrated by arrows 197. The embodiments of FIGS. 16-20 can be used to filter a variety of fluids, and are particularly helpful in filtering gas or air.

C. FIGS. 21-27, Example Support Structures

Example support structures usable with filter element 35, 160, 180 are shown and described in connection with FIGS. 21-27, below. The support structures may be those as described in U.S. patent application Ser. No. 14/521,811 filed Oct. 23, 2014, commonly assigned herewith, and incorporated by reference herein in its entirety.

Figure 22:
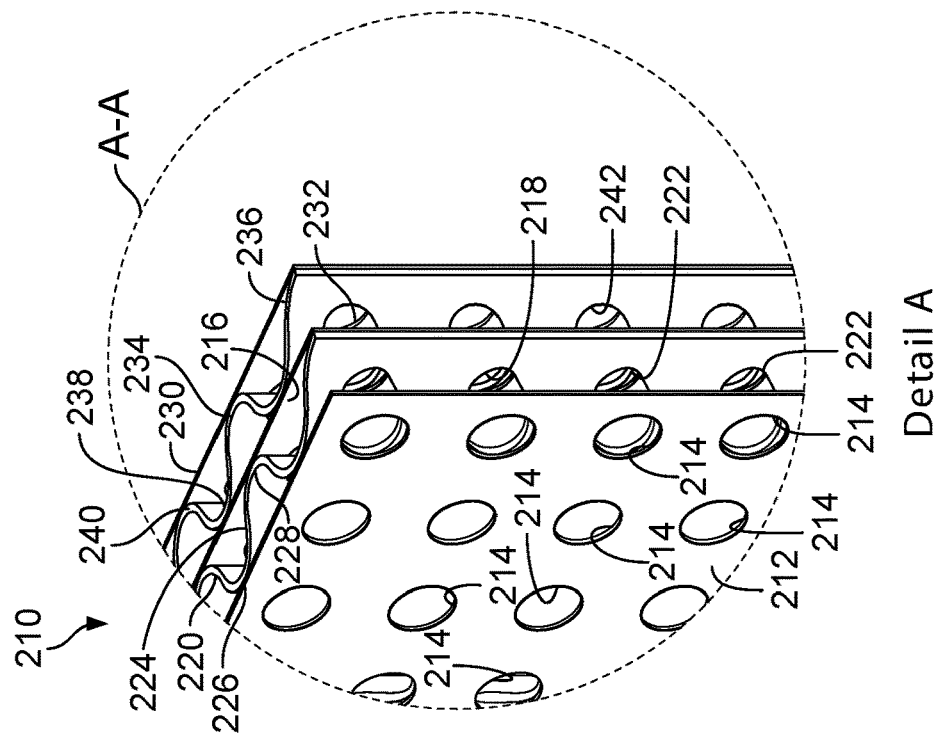
FIG. 22 is an enlarged view of detail A of FIG. 21.
Figure 21:
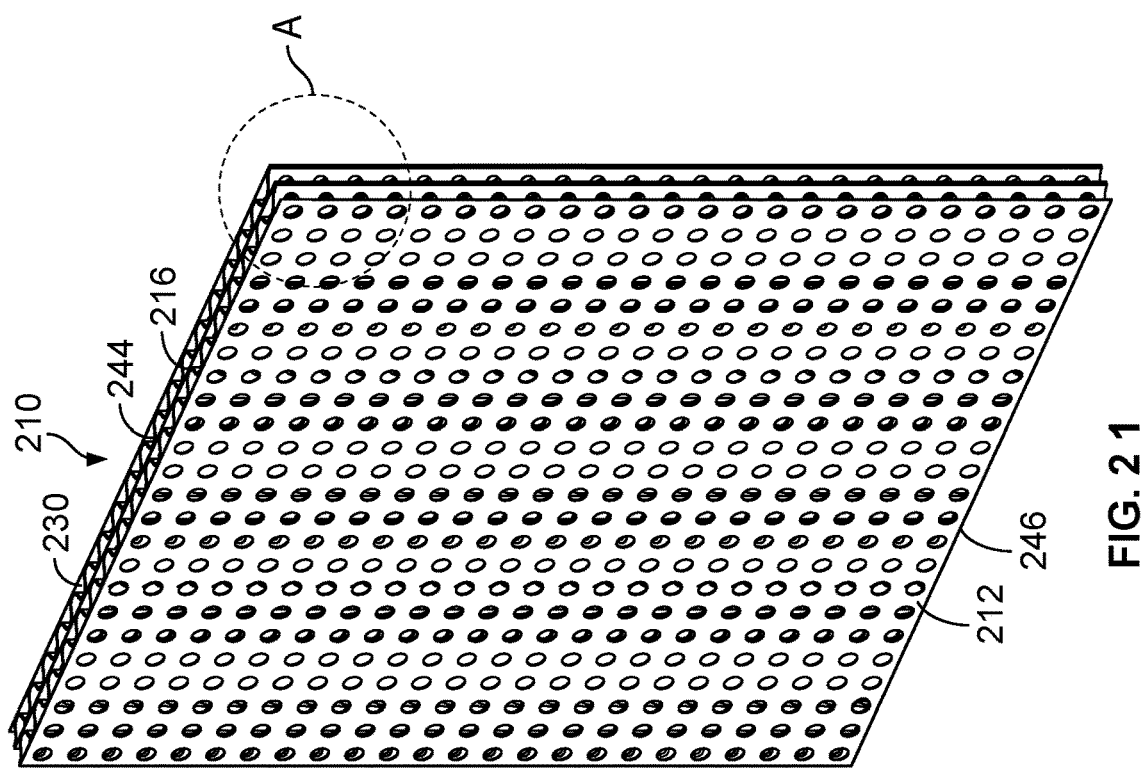
FIG. 21 is a perspective view of a first embodiment of a support structure that can be utilized in any of the previous embodiments.

FIGS. 21 and 22 illustrate a first example embodiment of a support structure 210 usable with any of the previous embodiments of elements 35, 160, 180. The support structure 210 can be used in an interior volume of a tubular construction of pleated media. As mentioned previously, by the term "tubular", it is meant any shape that forms a closed loop, which can be round, non-round, oval, elliptical. The support structure 210 can also be wedge-shaped for use with the V-pack elements 160, 180.

The support structure 210 includes at least a first member or sheet 212 of a material. In some examples, the material can be non-metal. The first sheet 212 is porous with a plurality of openings or holes 214 to allow fluid flow therethrough. In the example shown, although the porous holes 214 are illustrated as circular, it should be understood that any shape of hole can be used, provided that the fluid to be filtered can be passed through it without introducing excess restriction.

The support structure 210 includes at least a second member or sheet 216 of material. In some examples, the material can be non-metal. The second sheet 216 is porous in that it includes a plurality of openings or holes 218. Again, the openings 218 are shown to be circular, but can be any shape.

The first sheet 212 and second sheet 216 may be generally flat and planar, and absent of folds. In the example illustrated in FIG. 21, the first sheet 212 and second sheet 216 are generally rectangular in shape. Other shapes can be used.

The first sheet 212 and second sheet 216 are secured together and spaced apart in opposing relation (e.g., facing each other). The first sheet 212 and second sheet 216 can be secured together by using a first brace construction 240 (FIG. 22).

The first brace construction 240 is a material that will operably hold the first sheet 212 and second sheet 216 in a spaced-apart relation, but secure them together. In many examples, the first brace construction 240 is made from a non-metal material. The first brace construction 240 is porous by including a plurality of openings or holes 242.

As mentioned above, the first brace construction 240 can be any type of structure that will secure the first sheet 212 and second sheet 216 together, but hold them in a spaced apart relationship, and allow for the flow of fluid therethrough. In the particular example illustrated in FIGS. 21 and 22, the first brace construction 240 is a flute or first corrugated member or sheet 244.

The corrugated sheet 244 includes a member having a plurality of alternating ridges 246 and troughs 248. The exterior surface of the ridges 246 and troughs 248 are used for attaching or securing the sheets 212, 216 together. The sheets 212, 216 can be secured together using a variety of techniques such as glue or adhesive.

The support structure 210 can further include at least a third member or sheet 230. The third sheet 230, in many examples, can be of a non-metal material. The third sheet 230 will be porous with a plurality of openings or holes 232 to allow for fluid flow therethrough.

In the embodiment shown, the third sheet 230 is spaced apart from and opposing the second sheet 216. In this way, the second sheet 216 is located between the first sheet 212 and third sheet 230.

The third sheet 230 is secured to the second sheet 216. A second brace construction 234 can be used to secure the third sheet 230 and second sheet 216 together and in spaced apart, opposing relation.

A variety of implementations for the second brace construction 234 are possible. In the embodiment illustrated, the second brace construction 234 is a flute or second corrugated member or sheet 236.

As with the first corrugated sheet 244, the second corrugated sheet 236 includes a member having a plurality of alternating ridges 238 and troughs 240. Along the exterior of each ridge 238 and trough 240, the respective second sheet 216 and third sheet 230 can be attached to the corrugated construction 236. This attachment can be made by glue or adhesive or other techniques.

The second corrugated structure 236 includes a plurality of openings or holes 242 to allow fluid flow therethrough.

As can be seen in FIG. 22, third sheet 230 is on an opposite side of the second sheet 216 as the first sheet 212. When the support structure 210 is constructed as shown in FIGS. 1 and 4, the holes 214, 218, 232, and 242 will allow the passage of fluid, such as air or liquid, therethrough. These holes can be any shape.

In preferred constructions, the first sheet 212, second sheet 216, third sheet 230, first brace construction 240, and second brace construction 234 are non-metal. The non-metal material can include cellulose. Other non-metal materials can be used. For example, the core construction 210 can be made of plastic.

While the example embodiment shows the support structure 210 as having first sheet 212, second sheet 216, third sheet 230, first brace construction 240, and second brace construction 234, other embodiments can include further more sheets and more brace constructions.

In FIG. 21, it can be seen that the overall shape of the support structure 210 that is illustrated is rectangular in perimeter. Of course, other shapes can be used.

In the example shown in FIG. 21, each of the first sheet 212, second sheet 216, third sheet 230, first corrugated sheet 244 and second corrugated sheet 236 have a same length and a same width. There can be variations. The thickness, in this example, would be the distance between the first sheet 212 and third sheet 230.

The support structure 210 can be useful in any sized filter element longer than about 4 inches, and particular, benefits can be achieved in elements that are long, such as elements having a length of at least 250 inches, including elements having a length of at least 80 inches, and in some instances, elements being at least 90 inches long. In most embodiments, the length between the first end 244 and second end 246 will typically match the length of the element, in order to support the pleats, and be at least 250 inches long, or at least 80 inches long, or at least 90 inches long. In most embodiments, the support structure extends along the length of the filter element at least 250%, at least 75%, at least 85%, or at least 95%.

In an alternate embodiment, the filter element includes multiple shorter support structures, that may be connected, or may be spaced apart. The multiple shorter elements added together extend along the length of the filter element at least 250%, at least 75%, at least 85%, or at least 95%.

Figure 23:
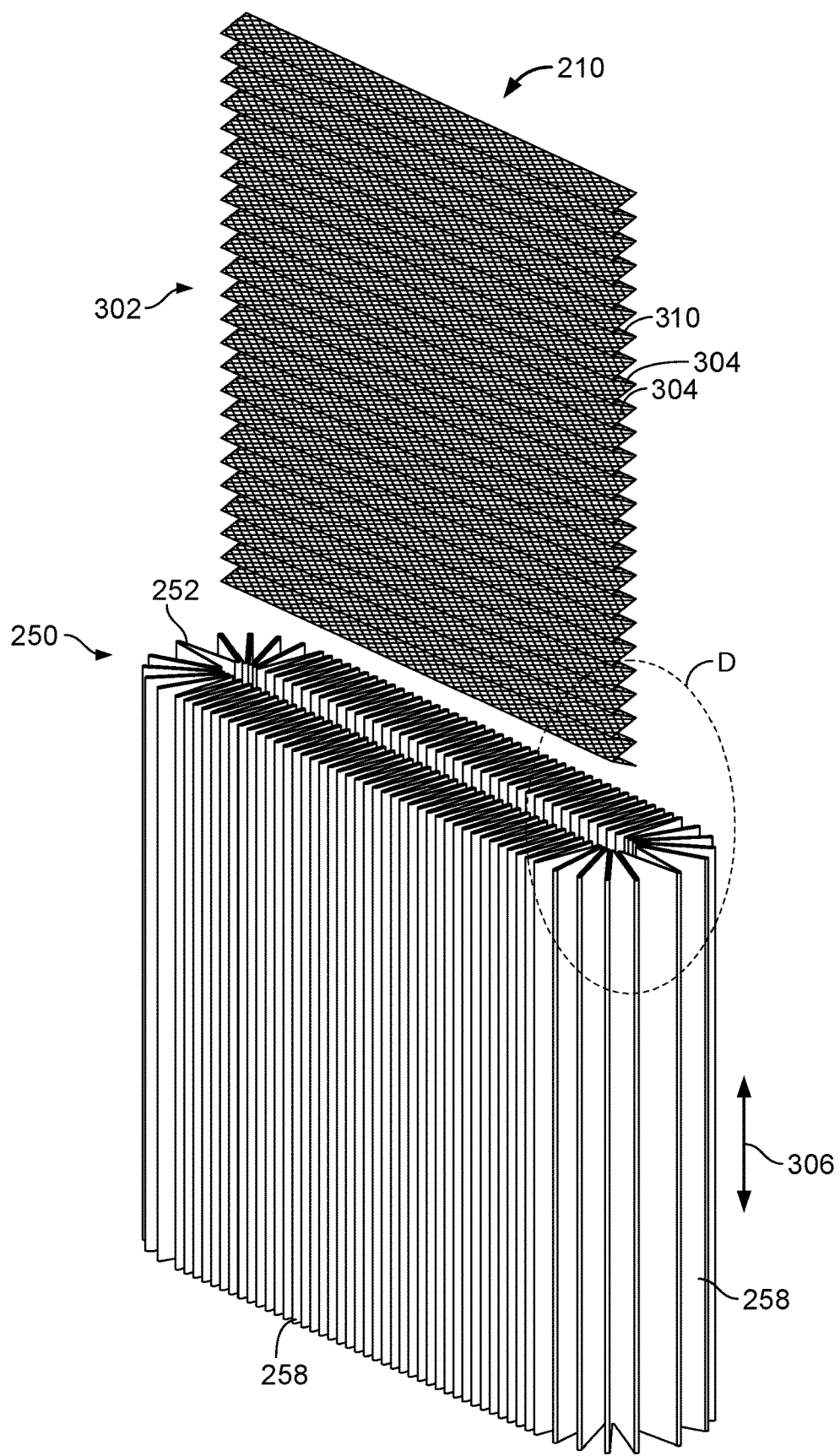
FIG. 23 is a perspective view of another embodiment of a support structure that can be utilized with any of the previous embodiments, the support structure being shown as it is being inserted into the interior of a pleated media construction.
Figure 24:
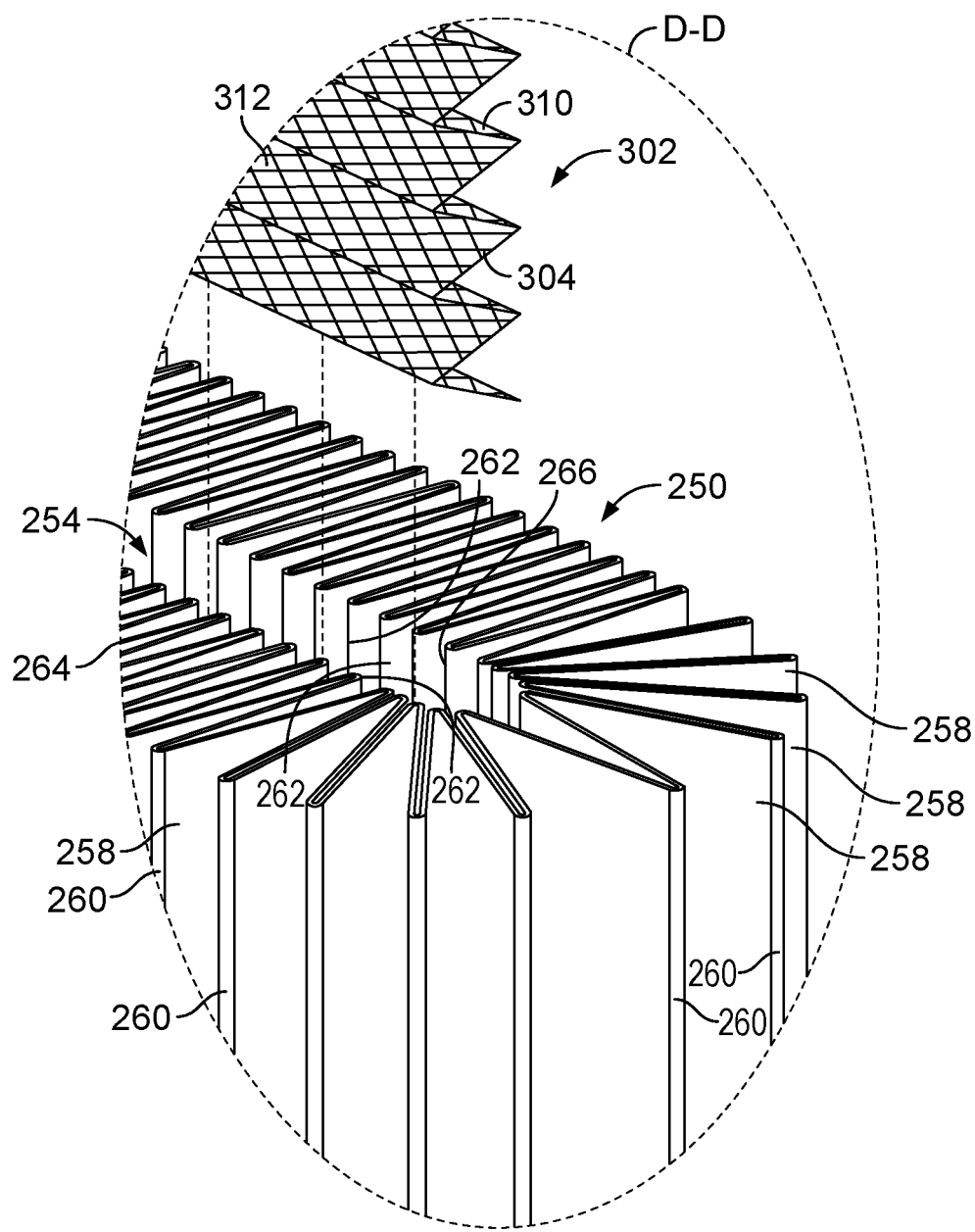
FIG. 24 is an enlarged view of detail D illustrated in FIG. 23.

FIGS. 23-24 illustrate another embodiment of support structure 210. In FIG. 210, support structure 210 comprises a pleated construction 310. The pleated construction 310 has at least a partial section with a plurality of pleats 304.

The plurality of pleats 304 in the pleated construction 310 can be extending in a direction that is non-parallel relative to a direction of pleats 258 in the pleated filter media 250. Preferably, the pleats 304 extend in a direction non-parallel and angled relative to the direction of pleats 258 of the pleated filter media 250.

FIG. 23 shows an arrow at 306 which is parallel to the direction of pleats 258 of the pleated filter media 250. The direction of pleats 304 is preferably angled at a non-zero angle relative to the direction 306 of the pleats of the pleated filter media 250. In one or more embodiments, the angle can be at least 20 degrees; or at least 30 degrees; or at least 45 degrees; or at least 70 degrees. In one or more embodiments, the direction of pleats 304 can be at an angle 80-100 degrees relative to the direction 306 of the pleats of the pleated filter media 250. In the example shown in FIG. 210, the pleated construction 310 has pleats 304 extending in a direction about perpendicular relative to the direction 306 of the pleats 258 of the pleated filter media 250. In one or more embodiments, the angle can be 20-30 degrees; or 30-40 degrees; or 45-70 degrees; or 70-80 degrees. In one or more embodiments, the angle can be 20-100 degrees.

In FIG. 23, the pleats 304 extend from the first opposing interior face 264 to the second opposing interior face 266 of the interior volume 254 of the pleated filter media 250. At least because the direction of pleats 304 is angled relative to the direction of pleats 258, this provides support to the pleated filter media 250.

The pleated construction 310 can be made from many types of materials. In preferred constructions, the pleated construction 310 comprises a semi-rigid pleated screen 302. The pleated screen 302 can be made from plastic or a reinforced cellulose. The pleated screen 302 has an open screen or mesh 312 to allow for fluid flow there through. Preferably, the pleated construction 310 has a void volume of no more than 60%.

The support structure 210 can act as a sound absorption mechanism. In noisy environments, such as environments using compressors, this sound absorption can be helpful in reducing the level of loudness and noise produced by the filter element during operation. The support structure 210 may also perform very coarse filtration.

Figure 25:
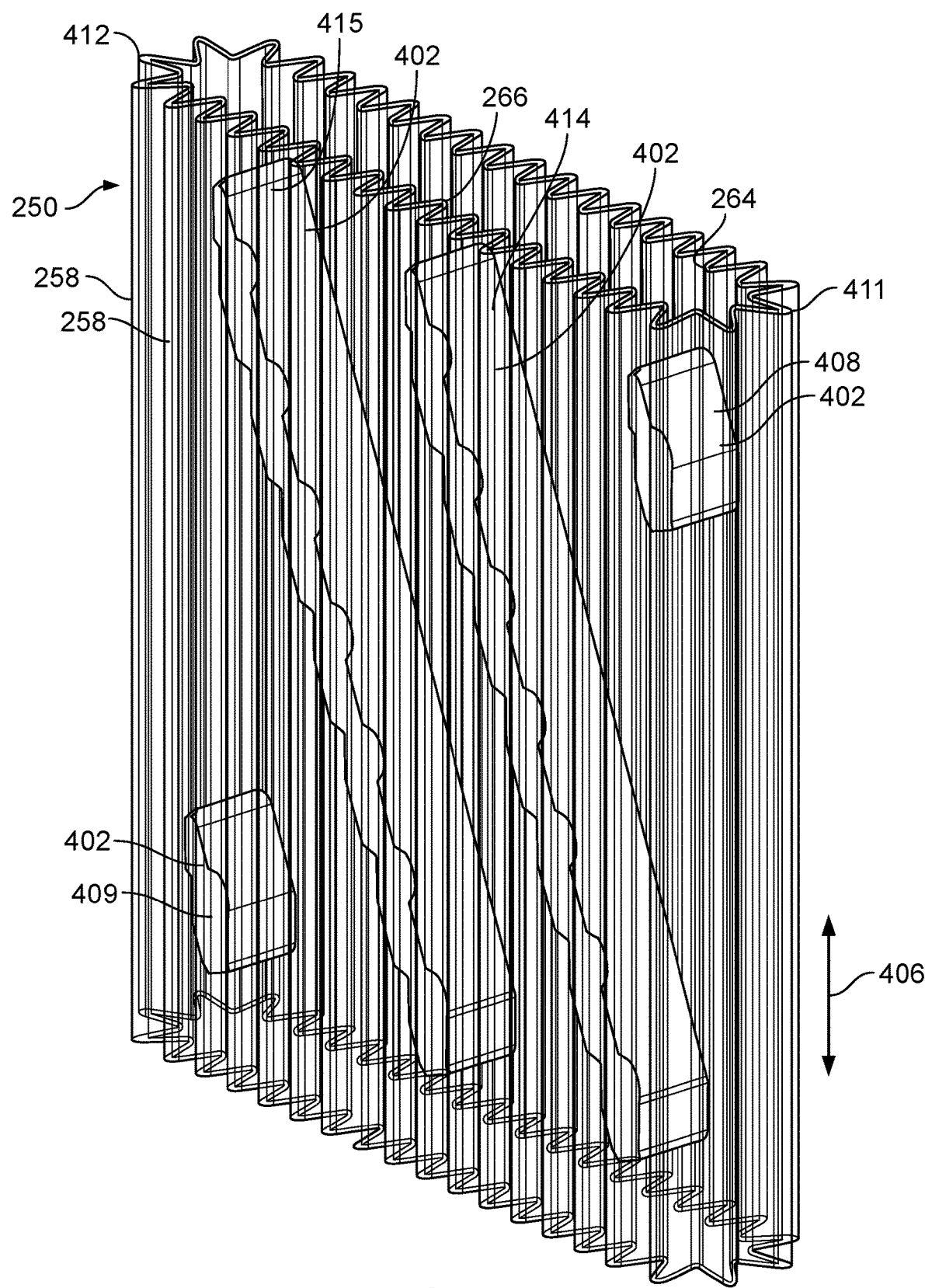
FIG. 25 is another embodiment of support structures that can be utilized with any of the previous embodiments, the support structures being shown located in the interior volume of a pleated media construction.
Figure 26:
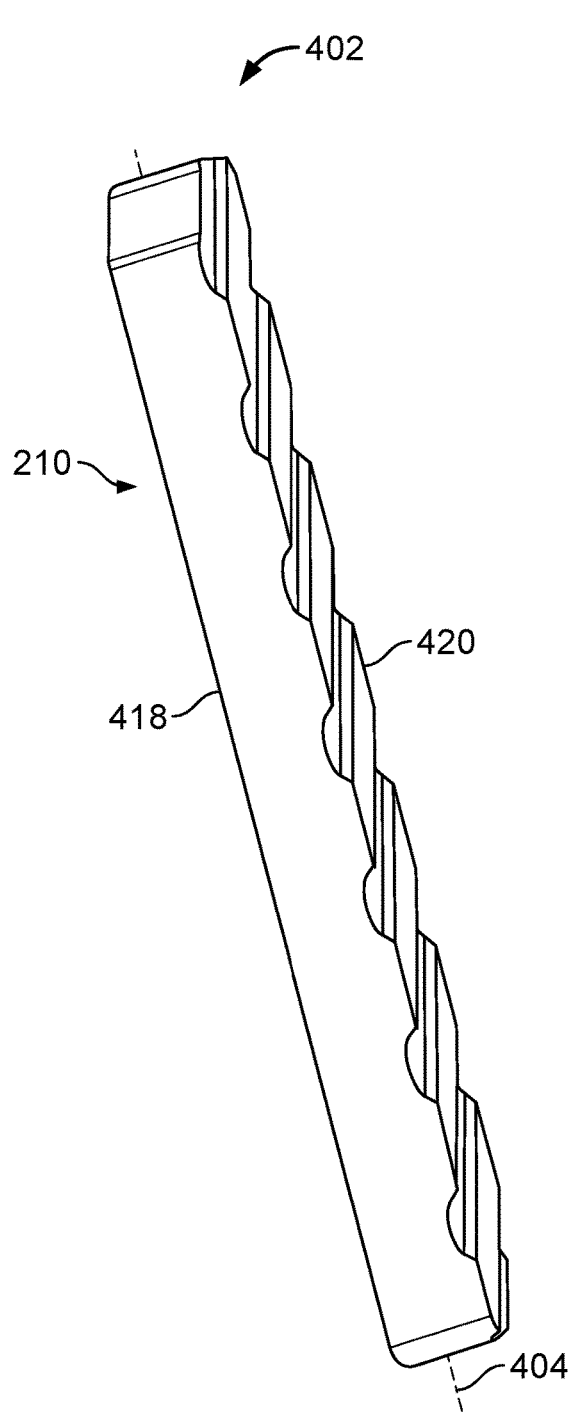
FIG. 26 is a perspective view of one of the support structures utilized in the embodiment of FIG. 25.
Figure 27:
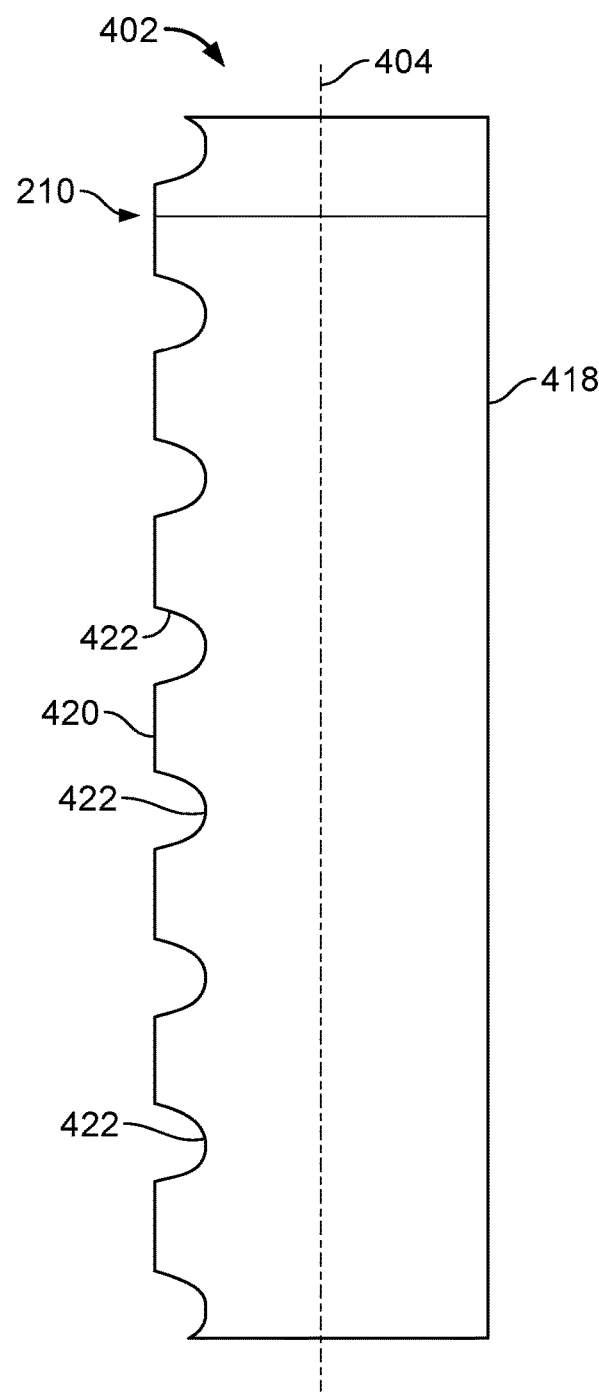
FIG. 27 is a side view of the support structure illustrated in FIG. 26.

FIGS. 25-27 illustrate another embodiment of support structure 210. In FIGS. 25-27, the support structure 210 comprises at least one molded spacer 402. In preferred implementations, there are a plurality of molded spacers 402.

The molded spacers 402 have a longitudinal axis 404 (FIG. 27) extending a length of the spacer 402 along its greatest dimension. The longitudinal axis 404 preferably extends in a direction that is non-parallel to a direction of pleats 258 in the pleated media 250.

FIG. 25 shows an arrow at 406 which is parallel to the direction of pleats 258 of the pleated media 250. The direction of the axis 404 of the spacer 402 is angled at a non-zero angle relative to the direction 406 of the pleats of the pleated media 250.

In one or more embodiments, the angle of the spacer 402 relative to the direction of pleats 258 of the pleated media can be at least 30 degrees and not greater than 170 degrees; or at least 45 degrees; or at least 70 degrees. In one or more embodiments, the angle can be 30-150 degrees; or 100-140 degrees.

In FIGS. 13-15, there are 4 spacers 402 depicted in the interior volume 254 of the pleated media 250. At least two of the spacers 402 have a different length. For example, in FIG. 25, two spacers 408, 409 are oriented in the interior volume 254 adjacent to the curved end sections 411, 412 of the tubular construction of pleated media 250. These spacers 408, 409 are shorter in length than spacers 414, 415 oriented between the spacers 408, 409.

FIGS. 26 and 27 depict an example embodiment of one of the spacers 402. The spacer 402 has a first wall 418 and an opposite second wall 420. When oriented in the filter interior volume 254, the first wall 418 will be secured to an interior face of the pleated media 250, while the second wall 420 will be secured to the opposing interior face of the pleated media 250.

The first wall 418 of the spacer 402 is depicted as relatively flat or planar. The second wall 420 is depicted as having a plurality of grooves or scallops 422 therein. The scallops 422 will help to hold the inner pleat tips 262.

Many different sizes can be made. In some example embodiments, the dimension between the first wall 418 and second wall 420 is at least 0.5 inch. In other examples, the dimension between the first wall 418 and second wall 420 is at least 1 inch and not greater than 12 inches. In other embodiments, the dimension between the first wall 418 and second wall 420 is 1-6 inches.

The spacers 402 can be made from many different types of materials. It is advantageous when the material is made from a liquid that cures into a solid because of convenient manufacturing techniques that can be used. For example, the spacers 402 can be made from polyurethane. The polyurethane can be high density polyurethane or a foaming polyurethane. The liquid material could have thixotropic properties as well.

The liquid material to be molded into the spacers 402 could be dispensed in liquid form onto the pleated media 250. Alternatively, the pre-cured liquid material to be molded into the spacers 402 could be dispensed into a mold on which the pleated media 250 would then be placed on top of to form a bond between the media 250 and the curing liquid. When the liquid material cures, it is secured to the media 250 to form the bridge between the opposing interior face 264 and interior face 266.

As mentioned above, the support structures 210, usable with any of the embodiments of FIGS. 1-20 can be non-metal, or they can include at least a portion that is metal-conductive. The metal-conductive portion may be any one of a conductive metal material or a conductive non-metal material, such as a conductive nylon. In some embodiments, the support structures 210 will extend a complete length between the first and second end caps 66, 74. In other embodiments, the support structures 210 will extend less than a complete length between the first and second end caps 66, 74.

In many preferred systems, the inner pleat tips or folds of the media sections, as described above, will be bonded to the support structures. In some instances, the media of the pleated media sections will include bi-component filter media that is thermally bonded to the support structures. In other arrangements, the pleated media of the various pleated media sections as described herein will include media that is pre-impregnated with epoxy thermally bonded to the support structures.

Figure 30:
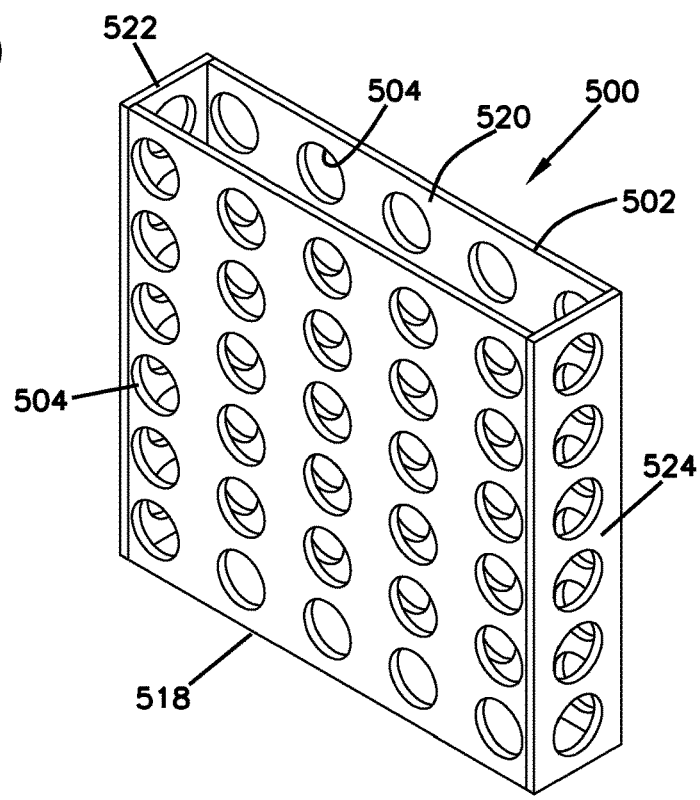
FIG. 30 is a perspective view of anti-interleaving structure used with the support structure in the element of FIGS. 28 and 29.

The filter elements can include anti-interleaving structure 500 (FIGS. 28-30), which prevents interleaving of the inner support with the pleats of the media sections. Many embodiments are possible including cross-braces over the spaces between the pleats. The cross-braces may be in the form of a hot-melt bead or strips of tape. The anti-interleaving structure may also include a porous wrap around the inner support, such as wrap 502 having apertures 504 depicted in FIG. 29.

Figure 28:
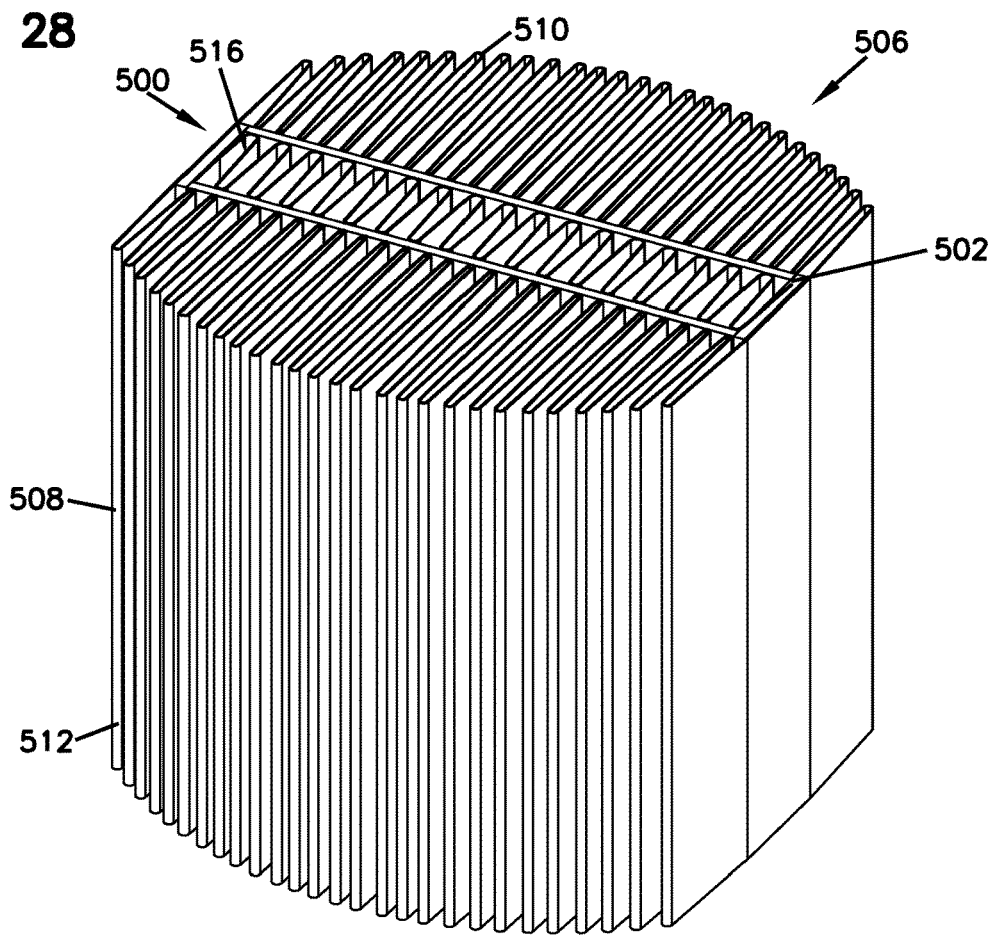
FIG. 28 is a perspective view of another embodiment of a filter element, in accordance with principles of this disclosure.

FIG. 28 depicts a filter element 506 having a continuous construction of pleated media 508 forming a first pleated media section 510 opposing a second pleated media section 512. Between the first pleated media section 510 and second pleated media section 512 is an inner volume 514. As with previous embodiments, there is a support structure 516 within the inner volume 514 configured to support, absent an inner liner, the first media section 510 and the second media section 512 and being between the first and second media sections 510, 512.

Figure 29:
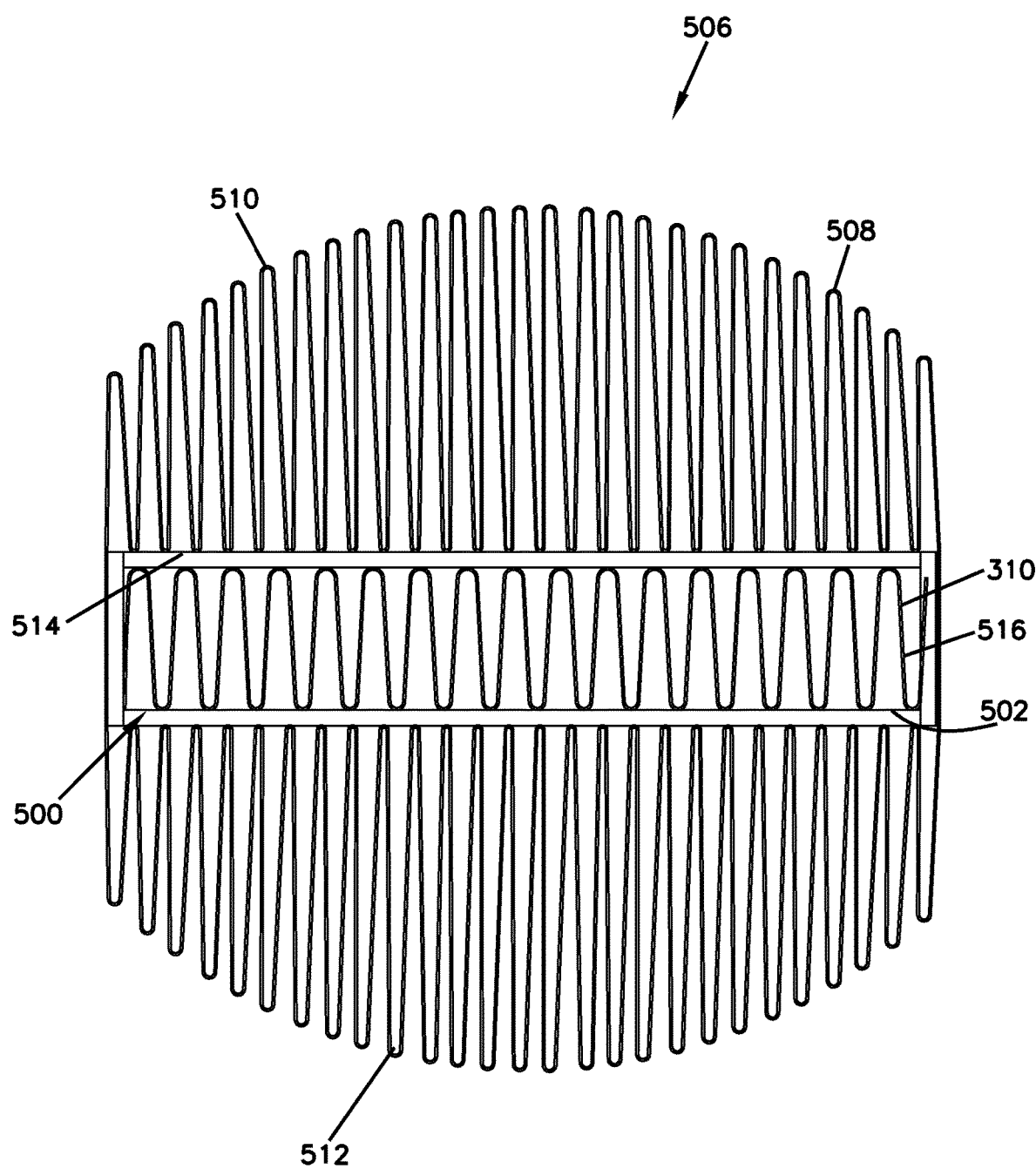
FIG. 29 is a top view of the filter element of FIG. 28.

In the embodiment of FIGS. 28 and 29, the support structure 516 can be in the form of pleated construction 310, as described above with respect to FIGS. 23-24. In the previous embodiment, however, the pleated construction 310 described the pleats as extending in a direction non-parallel and angled relative to the direction of pleats of the pleated filter media. In the embodiment of FIGS. 28 and 29, the direction of pleats of the media 508 is generally parallel to the direction of pleats of the pleated construction 310. The anti-interleaving structure 500 prevents interleaving of the pleated construction 310 with the pleats of the media 508. The anti-interleaving structure 500 is designed such that it does not function as a rigid support structure for the element 506. In other words, the anti-interleaving structure 500 will not function as a typical prior art inner liner.

While the anti-interleaving structure 500 is shown in FIGS. 28 and 29 with an embodiment having only first and second opposing pleated media sections 510, 512, it should be understood that this same principle of operation would work in any of the previous embodiments described including FIGS. 6-12, which included third and fourth pleated media sections in addition to the first and second pleated media sections. Many embodiments of anti-interleaving support structures are envisaged In the example of FIG. 30, the anti-interleaving structure 500 is in the form of wrap 502. The wrap 502 has opposing walls 518, 520 and opposing end walls 522, 524. The walls 518, 520, 522, 524 together form a surrounding wall or wrap, which will contain the pleated construction 310. The apertures 504 through the walls 518, 520, 522, 524 allow for the flow of fluid, such as liquid to be filtered.

FIGS. 4 and 6 illustrate end cap 66 that is useful for filter elements as described herein. The end cap 66 comprises a solid material 550. The solid material can be, for example, a hard plastic urethane material, or it may be metal. The end cap 66 has an outer periphery 552. In the embodiment shown in FIGS. 4 and 6, the outer periphery 552 is circular in shape. In other embodiments, the outer periphery 552 could be other shapes, including race track shape, oval shape, or rectangular (FIG. 20).

The end cap 66 has a top surface 554 and an opposite bottom surface 556. The end cap 66 further includes first outlet opening 70 passing from the top surface 554 through the bottom surface 556. The end cap 66 has second outlet opening 71 passing from the top surface 554 through the bottom surface 556. The first outlet opening 70 and second outlet opening 71 are spaced from each other.

The end cap 66 is free of openings other than the first outlet opening 70 and second outlet opening 71. Thus, the end cap 66 is solid and non-porous, with the exception of the outlet openings 70, 71.

Many embodiments for end cap 66 are possible. In the embodiment shown in FIG. 4, the end cap 66 includes the first outlet opening 70 and second outlet opening 71 as being rectangular in shape. In this embodiment, the outlet openings 70, 71 are parallel to each other.

Figure 32:
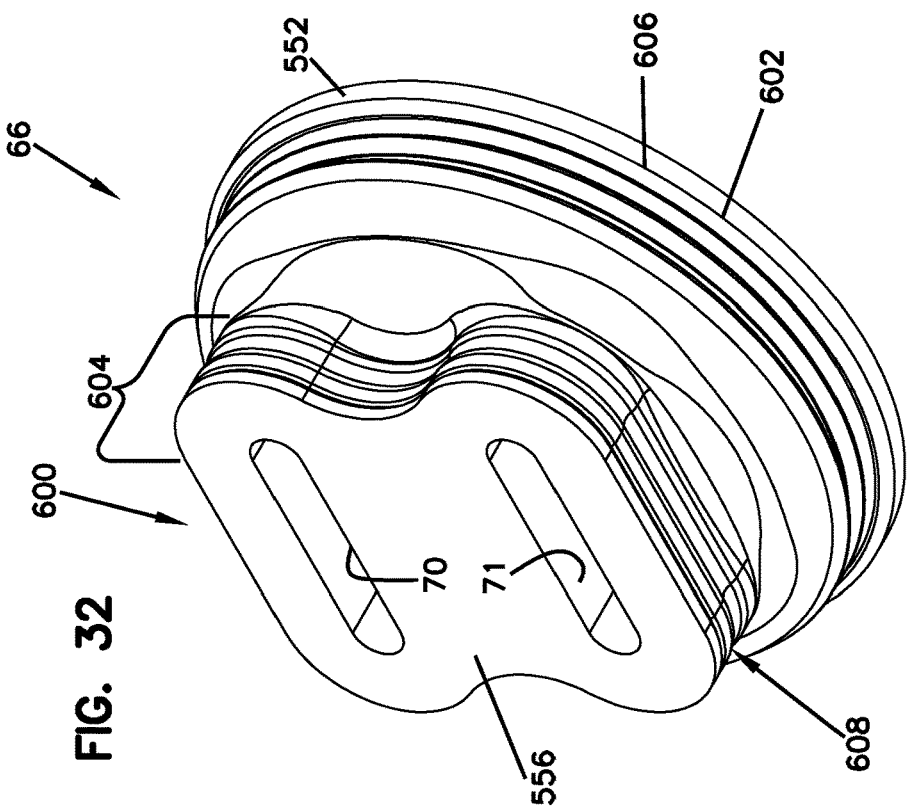
FIG. 32 is a bottom perspective view of the end cap of FIGS. 4, 6, and 31.
Figure 31:
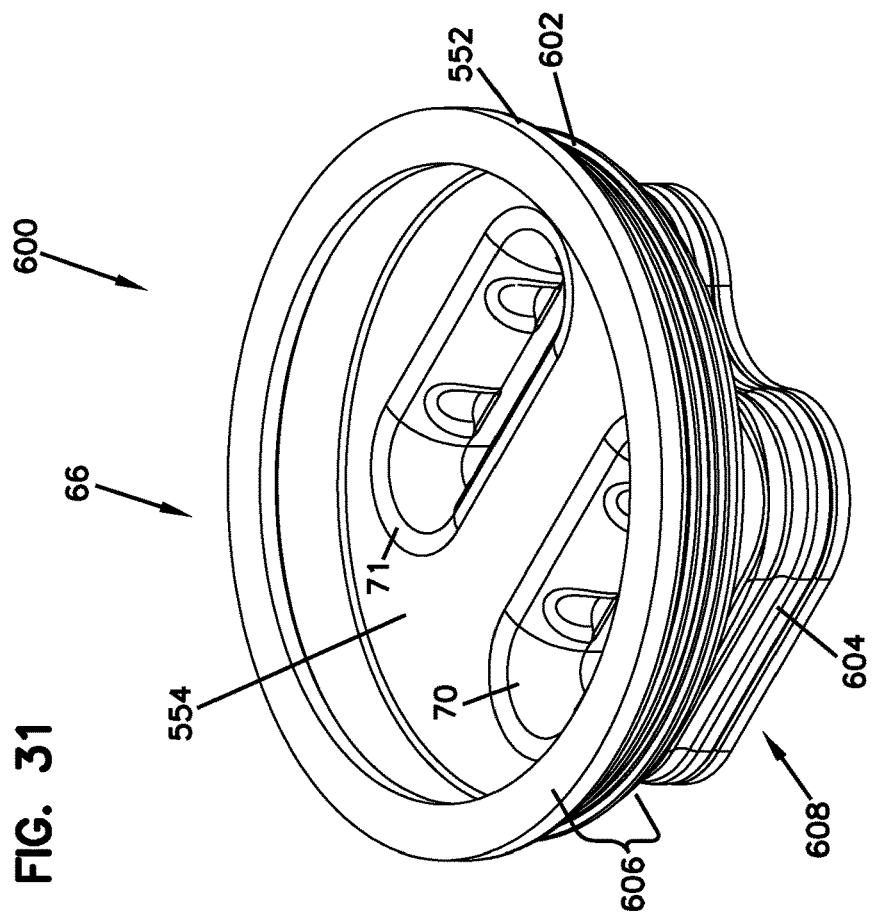
FIG. 31 is a perspective view of the end cap shown in FIGS. 4 and 6, constructed in accordance with principles of this disclosure.

FIGS. 31 and 32 illustrate perspective views of end cap 66. It was discovered that if the end cap 66 is made from a material of uniform density, such as a soft polyurethane that is sufficiently soft to form a seal with a tube sheet, the end cap 66 may tear along the outer peripheral side, at the portion where it connects with the filter media, at pressures of about 25 psi. To address this problem, some end caps 66 are made having at least two densities to achieve advantages. As such, the end cap 66 can be a composite end cap 600.

The composite end cap 600 includes outer periphery 552, top surface 554, and opposite bottom surface 556. First and second outlet openings 70, 71 pass from the top surface 554 through the bottom surface 556.

The composite end cap 600 includes a sealing portion 602. The sealing portion 602 is constructed and arranged to form a seal with a tube sheet, when the end cap 600 is operably installed within a tube sheet.

The composite end cap 600 includes a media attachment portion 604. The media attachment portion 604 is along the bottom surface 556. The media sections, as described above such as media sections 52, 54, 60, 62, are secured to the media attachment portion 604. For example, the media sections (e.g., 52, 54, 60, 62) will be placed within the end cap 600 during the molding process, before the material comprising the end cap 600 has cured. This will bond the media sections to the end cap 600 at the media attachment portion 604.

The sealing portion 602 is made to be softer than the media attachment portion 604. For example, it has been found useful to have the sealing portion 602 to have a hardness of about 50-60 Shore A, while the media attachment portion 604 has a hardness of about 70-80 Shore A. The sealing portion 602 preferably consists of a single material with a hardness of 50-60 Shore A. The media attachment portion 604 preferably consists of a single material with a hardness of 70-80 Shore A.

In the embodiment shown, the sealing portion 602 is along the outer periphery 552 of the end cap 600. The media attachment portion 604 is along the bottom surface 556. In this manner, the soft portion of the composite end cap 600 is illustrated along the periphery at 606, where the seal would be formed. The harder portion of the composite end cap 600 is at 608, at the media attachment portion 604, which is spaced from where the seal would be formed with the tube sheet and is where the media sections would attach.

In many preferred embodiments, the composite end cap 600 is made from polyurethane, such as a foamed polyurethane. The end cap 600 can be made either by rapid injection molding, or by other processes. In one process, the softer polyurethane is poured into a silicone mold. While the softer polyurethane is in the gelling process, before complete curing, the harder polyurethane is poured into the mold. Next, the media sections are mounted into the uncured polyurethane in the mold. The polyurethane is then allowed to cure, and the end cap with the media sections is demolded. The result is composite end cap 600 having dual densities, in which the portion along the periphery 552 is sufficiently soft to form a seal with a tube sheet, and the remaining portion, including the portion 604 that attaches to the media sections is harder and stronger for sustaining operating pressures, for example, pressures in excess of 25 psi. That is, the sealing portion 602 preferably consists of polyurethane foam having a hardness of 50-60 Shore A, and the media attachment portion 604 preferably consists of polyurethane foam with a hardness of 70-80 Shore A.

D. General Method

A method of filtering using the principles as characterized herein can be applied. The method includes providing a filter element according to any of the filter elements as variously characterized above. Fluid is directed to flow through the pleated media sections. While the fluid is flowing through the pleated media sections, there is a step of supporting the filter media sections to prevent the filter media from collapsing together by using the support structure. The support structure will support the filter media; absent the use of a typical prior art inner liner. In various examples, the support structure can include any of the types as variously characterized herein and described previously.

The above represents example principles. Many embodiments can be made applying these principles.

What is claimed is:

1. A filter element comprising:
   (a) a first pleated media section, second pleated media section, third pleated media section, and fourth pleated media section; each of the first, second, third, and fourth pleated media sections being spaced apart by a respective gap;
   (b) a first support structure configured to support, absent an inner liner, the first and second media sections and being layered between the first and second media sections within the respective gap between the first and second media sections; and
   (c) a second support structure configured to support, absent an inner liner, the third and fourth media sections and being layered between the third and fourth media sections within the respective gap between the third and fourth media sections.

2. The filter element of claim 1 further including:
   (a) first and second opposite end caps secured to opposite ends of the first and second media sections.

3. The filter element of claim 1 further comprising:
   (a) a third support structure.

4. The filter element of claim 3 wherein:
   (a) the third support structure is layered between the second and third media sections within the respective gap between the second and third media sections.

5. The filter element of claim 3 wherein:
   (a) the first and second media sections are a continuous pleated media section forming a first media racetrack with a first interior volume;
      (i) the first support structure being operably oriented in the first interior volume;
   (b) the third and fourth media sections are a continuous pleated media section forming a second media racetrack with a second interior volume;
      (i) the second support structure being operably oriented in the second interior volume; and
   (c) the first media racetrack is spaced from the second media racetrack with a third interior volume therebetween.

6. The filter element of claim 3 wherein:
   (a) the first and second media sections form a first media V-pack with a first interior volume;
      (i) the first support structure being operably oriented in the first interior volume;
   (b) the third and fourth media sections form a second media V-pack with a second interior volume;
      (i) the second support structure being operably oriented in the second interior volume.

7. The filter element of claim 2 wherein:
   (a) the first end cap comprises at least two different densities.

8. The filter element of claim 7 wherein:
   (a) the first end cap includes a sealing portion constructed and arranged to form a seal with a tubesheet; and a media attachment portion constructed and arranged to secure to each of the media sections.

9. The filter element of claim 8 wherein:
   (a) the sealing portion of the first end cap is softer than the media attachment portion.

10. A filter element comprising:
    (a) a continuous construction of pleated media forming first and second opposing pleated media sections with an interior volume therein; the pleats of the first and second sections each having inner pleat folds and outer pleat folds;

(b) a support structure within the interior volume configured to support absent an inner liner the first and second media sections and being between the first and second media sections; and (c) anti-interleaving structure to prevent interleaving of the support structure with the pleats of at least one of the first pleated media section or second pleated media section.

11. The filter element of claim 10 further including:
(a) first and second opposite end caps secured to opposite ends of the first and second media sections.

12. The filter element of claim 10 wherein:
(a) the first and second media sections and the support structure are configured such that an outer perimeter defined by outward facing portions of the first and second media sections and the support structure has two opposite domes joined by opposite flat sides.

13. The filter element of claim 10 wherein:
(a) the inner pleat folds of each of the first and second pleated media sections are bonded to the support structure.

14. The filter element of claim 11 wherein:
(a) the first end cap comprises at least two different densities.

15. The filter element of claim 14 wherein:
(a) the first end cap includes a sealing portion constructed and arranged to form a seal with a tubesheet; and a media attachment portion constructed and arranged to secure to each of the media sections.

16. The filter element of claim 15 wherein:
(a) the sealing portion of the first end cap is softer than the media attachment portion.

17. A method of filtering using the end cap of claim 1, the method comprising:
(a) directing fluid to flow through the pleated filter media sections; and
(b) while the fluid is flowing through the pleated filter media sections, supporting the filter media sections to prevent the filter media from collapsing together by using the support structure.

18. An end cap for a filter element; the end cap comprising:
(a) a solid material defining an outer periphery, a top surface, an opposite bottom surface;
(b) a first outlet opening passing from the top surface through the bottom surface; and
(c) a second outlet opening passing from the top surface through the bottom surface and spaced from the first outlet opening.

19. A filter element having a first end cap according to claim 18, the filter element comprising:
(a) a second end cap at an opposite end of the filter element from the first end cap;
(b) a first pleated media section, a second pleated media section, third pleated media section, and fourth pleated media section, each extending between the first end cap and second end cap; each of the first, second, third, and fourth pleated media sections being spaced apart from a next adjacent one of the first, second, third, and fourth pleated media sections; and
(c) the first outlet opening being in communication with an open space between the first pleated media section and second pleated media section; and
(d) the second outlet opening being in communication with an open space between the third pleated media section and the fourth pleated media section.

* * * * *